United States Patent
Nakamura

(10) Patent No.: US 8,976,402 B2
(45) Date of Patent: Mar. 10, 2015

(54) METHOD OF CONTROLLING COMMUNICATION SYSTEM

(71) Applicant: Canon Kabushiki Kaisha, Tokyo (JP)

(72) Inventor: Tadahiro Nakamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/332,883

(22) Filed: Jul. 16, 2014

(65) Prior Publication Data

US 2015/0036178 A1 Feb. 5, 2015

(30) Foreign Application Priority Data

Aug. 5, 2013 (JP) .................................. 2013-162799

(51) Int. Cl.
*H04N 1/04* (2006.01)
*G06F 3/12* (2006.01)
*H04L 29/08* (2006.01)

(52) U.S. Cl.
CPC .............. *G06F 3/1236* (2013.01); *H04L 67/02* (2013.01); *G06F 3/1287* (2013.01); *G06F 3/1203* (2013.01)
USPC ........................... 358/1.15; 358/1.13; 358/1.9

(58) Field of Classification Search
USPC ........................ 358/1.15, 1.13, 1.9
See application file for complete search history.

(56) References Cited

U.S. PATENT DOCUMENTS

| 2009/0080023 A1* | 3/2009 | Watabe ..................... 358/1.15 |
| 2010/0169785 A1 | 7/2010 | Jesudason ................. 715/733 |
| 2013/0007224 A1* | 1/2013 | Yang ........................ 709/219 |

FOREIGN PATENT DOCUMENTS

JP  2010-157240 A  7/2010

* cited by examiner

*Primary Examiner* — Houshang Safaipour
(74) *Attorney, Agent, or Firm* — Fitzpatrick, Cella, Harper & Scinto

(57) ABSTRACT

In a communication system including an image processing apparatus having a VNC server and a Web client, a terminal device having a VNC viewer and a Web client and an information processing apparatus having a Web server, the Web client of the image processing apparatus establishes a first connection with the Web server of the information processing apparatus, and the Web client of the terminal device establishes a second connection with the Web server of the information processing apparatus. The image processing apparatus transmits screen information of an operation panel of the image processing apparatus to the terminal device via the information processing apparatus, and the VNC viewer of the terminal device displays the screen information on a display unit of the terminal device.

4 Claims, 21 Drawing Sheets

F I G. 1
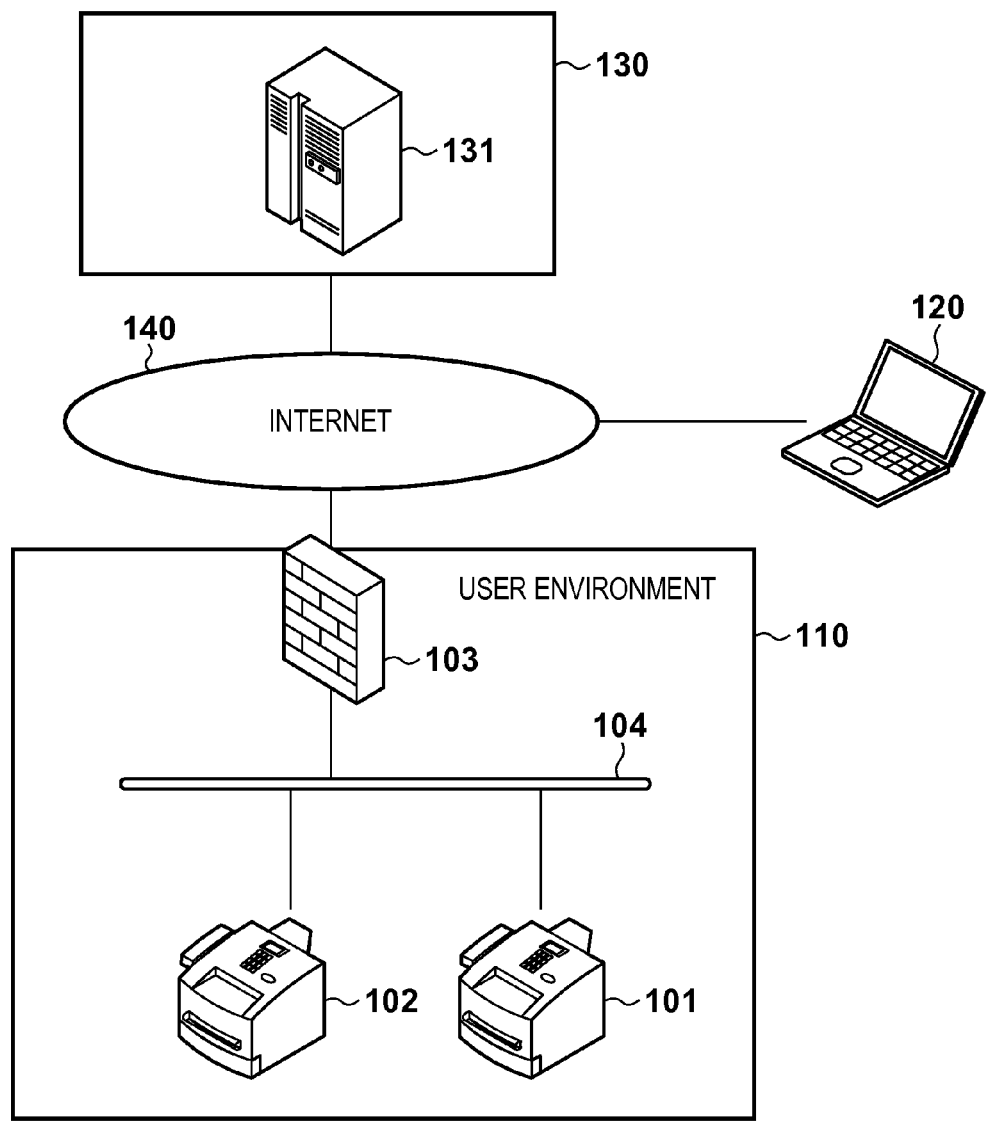

F I G. 4A
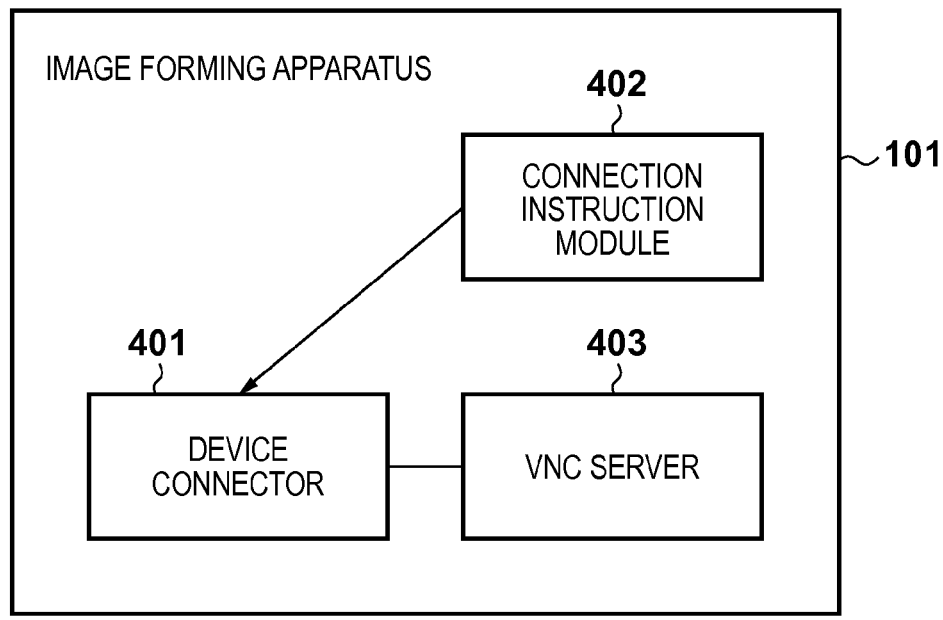
F I G. 4B
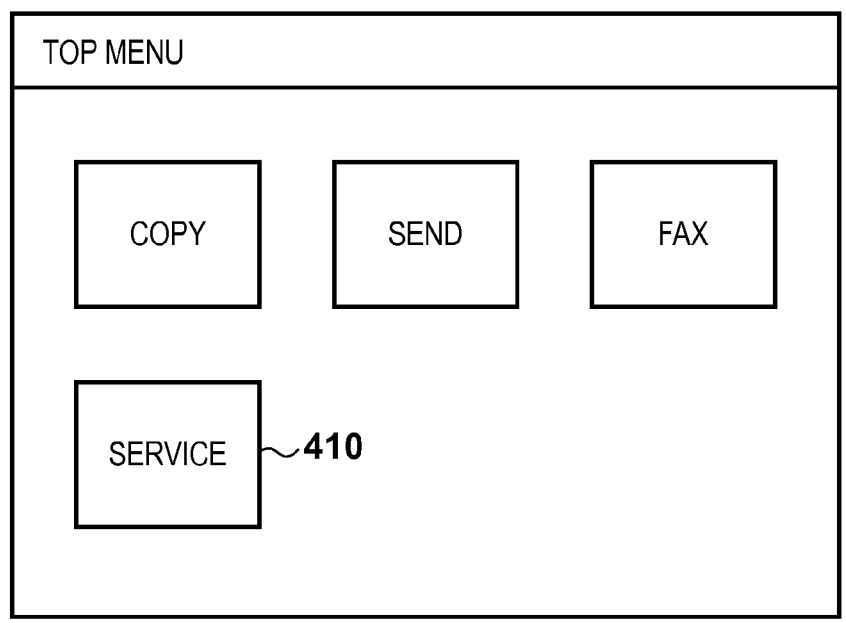

FIG. 6A

| SERIAL NUMBER | MODEL NAME | CUSTOMER NAME | SERVICEMAN NAME |
|---|---|---|---|
| SN0001 | MFP1 | COMPANY A | serv1 |
| SN0002 | MFP1 | COMPANY B | serv2 |
| SN0003 | MFP2 | COMPANY C | serv2 |
| SN0004 | MFP3 | COMPANY A | serv1 |

FIG. 6B

| SERIAL NUMBER | MODEL NAME | CUSTOMER NAME | CONNECTION DATE/TIME | SERVICEMAN CONNECTION DATE/TIME | CORRESPONDING SERVICEMAN NAME |
|---|---|---|---|---|---|
| SN0001 | MFP1 | COMPANY A | 2012/10/31 13:00 | 2012/10/31 13:01 | serv1 |
| SN0002 | MFP1 | COMPANY B | 2012/10/31 13:05 | | |
| SN0004 | MFP3 | COMPANY A | 2012/10/31 13:10 | | |

```
<ConnectRequest>
  <SerialNo>SN0004</SerialNo>
  <ModelName>MFP3</ModelName>
</ConnectRequest>
```

```
<VNCConnectRequest>
</VNCConnectRequest>
```

F I G. 12
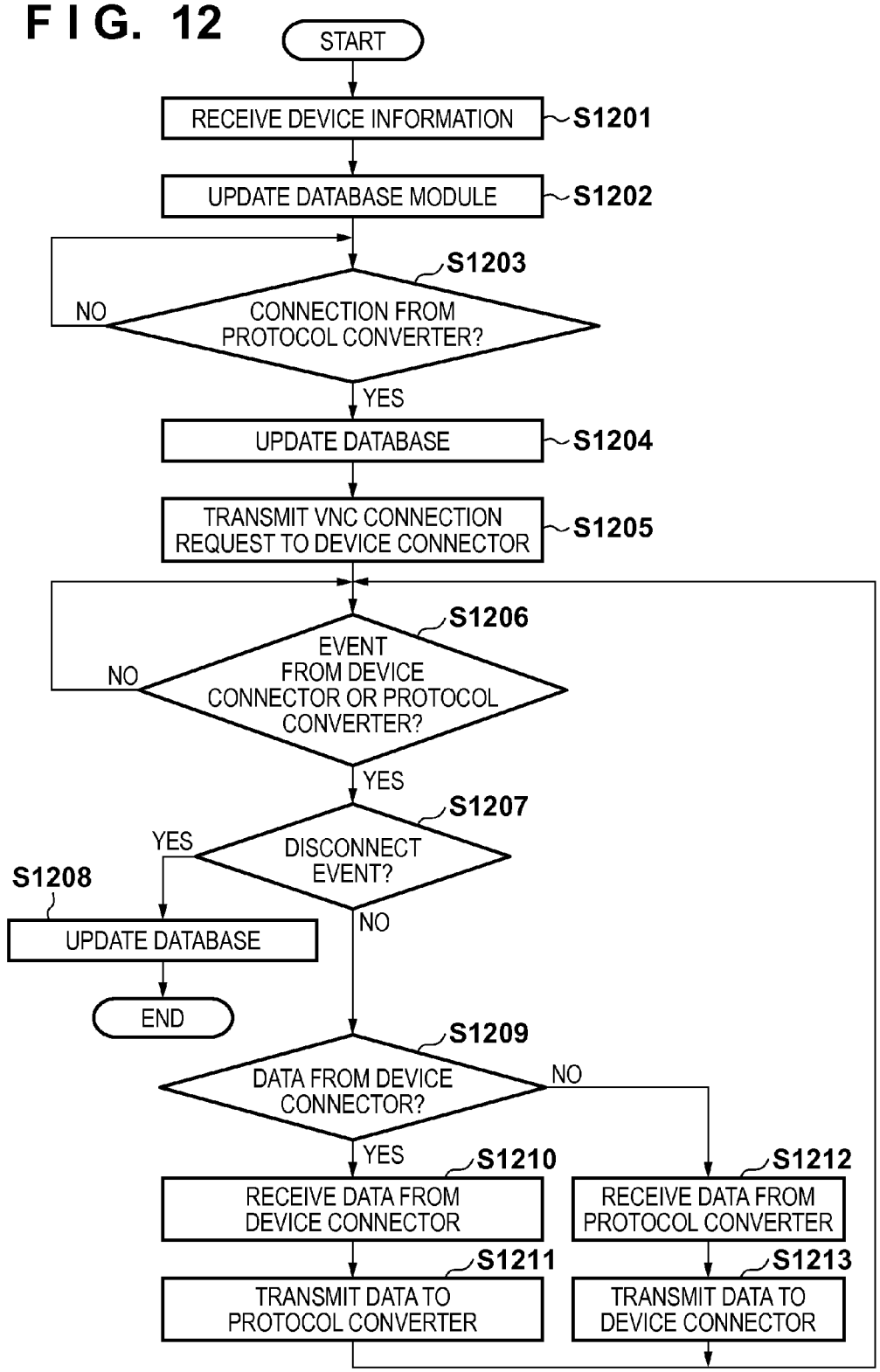

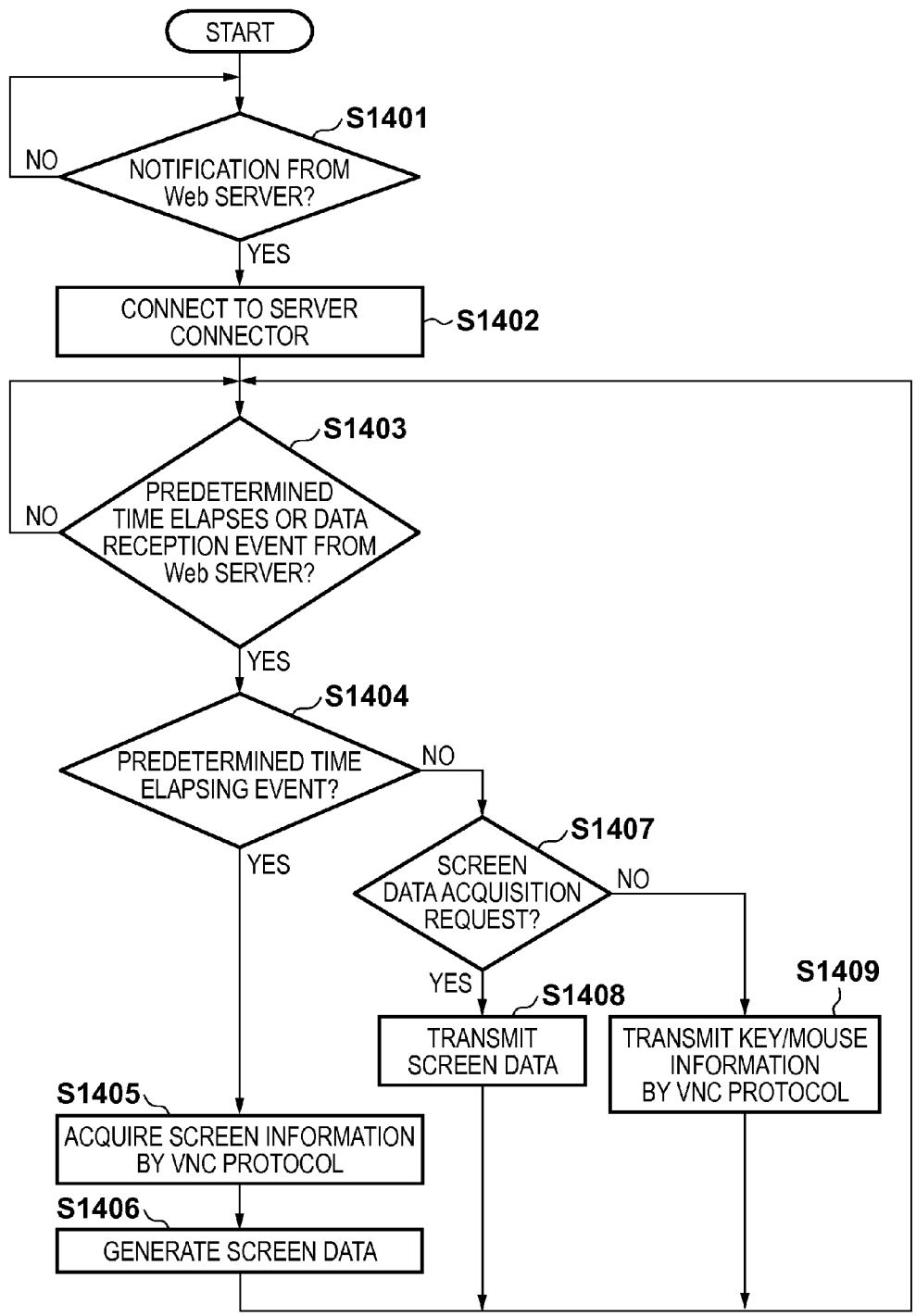

F I G. 15A
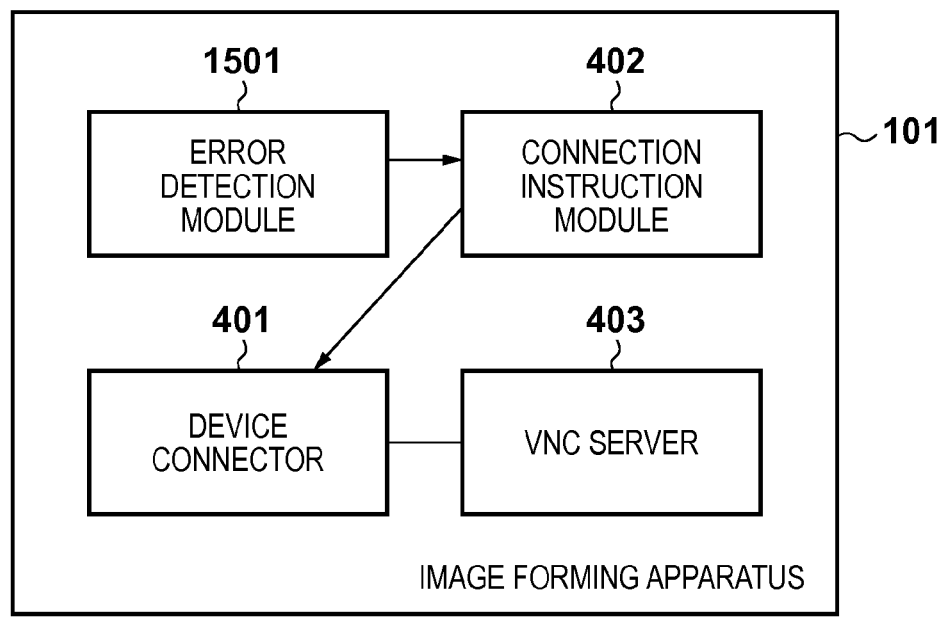
F I G. 15B
```
<ConnectRequest>
  <SerialNo>SN0001</SerialNo>
  <ModelName>MFP1</ModelName>
1510 — <Priority>1</Priority>
1511 — <State>Critical Error</State>
</ConnectRequest>
```

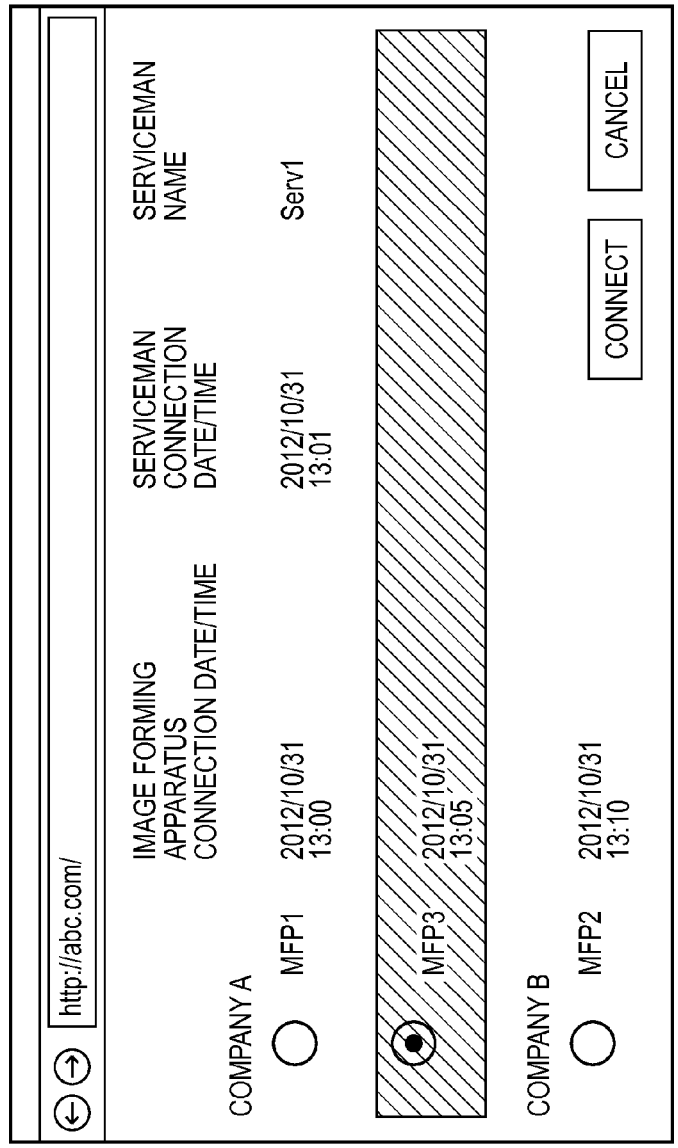

METHOD OF CONTROLLING COMMUNICATION SYSTEM

BACKGROUND OF THE INVENTION

1. Field of the Invention

The present invention relates to a method of controlling a communication system.

2. Description of the Related Art

Conventionally, image forming apparatuses having a server function, such as that of a Web server, a file server, or the like, have appeared, and it has become possible to use the server function of this kind of image forming apparatus from a remote terminal via a network. One of these kinds of server functions is a VNC (Virtual Network Computing) server. A remote terminal is able to display screens, on a display module of the terminal, of an operation panel of an image forming apparatus by using an application referred to as a VNC viewer for the image forming apparatus having a VNC server function. With this, a user of the terminal is able to operate the operation panel of the image forming apparatus with the same feeling as being in the place that the image forming apparatus is located.

Also, in order to make the VNC viewer unnecessary, conversion software for converting between an HTTP (Hypertext Transfer Protocol) and the VNC protocol exists. When the conversion software is used, it is possible to display a screen of an operation panel of an image forming apparatus on a general Web browser, and to operate the image forming apparatus via the screen without installing a VNC viewer on the remote terminal.

In Japanese Patent Laid-Open No. 2010-157240, a technique is recited in which when a request for a screen acquisition is transmitted by an HTTP to a gateway from a PC, the gateway acquires screen information from an image forming apparatus by the VNC protocol, and returns the screen information to the PC by the HTTP. With this kind of technique, an administrator of the image forming apparatus can confirm a status of the image forming apparatus from a PC at his or her own seat without going to the place that the image forming apparatus is located in an office.

However, in the conventional configuration, it is necessary to establish a connection to a VNC server from a VNC viewer, conversion software, or the like. For this reason, in an environment in which an image forming apparatus having a VNC server exists inside a firewall, a VNC viewer, conversion software, or the like, on the Internet could not connect with the image forming apparatus. This is because the firewall is configured so as to reject connections to internal terminals from the outside, and so VNC viewers, conversion software, or the like on the Internet, could not establish a connection with the VNC server of the image forming apparatus. For this reason, there was no way for a serviceman of the image forming apparatus to confirm the status by connecting to the VNC server of the image forming apparatus of a customer.

SUMMARY OF THE INVENTION

An aspect of the present invention is to eliminate the above-mentioned problems with conventional technology.

A feature of the present invention is to provide a technique of enabling communication between a terminal device and an image forming apparatus by connecting to the image forming apparatus inside of a firewall from the terminal device outside of the firewall, for example.

The present invention in an aspect provides a method of controlling in a communication system including an image processing apparatus having a VNC server and a Web client, a terminal device having a VNC viewer and a Web client, and an information processing apparatus having a Web server, the method comprising: a first connection step of, by the Web client of the image processing apparatus, making a request for a connection to the Web server of the information processing apparatus to establish a first connection; a second connection step of, by the Web client of the terminal device, making a request for a connection to the Web server of the information processing apparatus to establish a second connection; a first transmission step of, by the Web client of the image processing apparatus, transmitting to the Web server of the information processing apparatus, screen information of an operation panel of the image processing apparatus provided by the VNC server of the image processing apparatus; a first request step of, by the Web client of the terminal device, making a request for data to the Web server of the information processing apparatus; a first response step of, by the Web server of the information processing apparatus, transmitting to the Web client of the terminal device, the screen information transmitted in the first transmission step as a response in response to the request in the first request step; and a first display control step of, by the VNC viewer of the terminal device, controlling to display based on the screen information transmitted in the first response step.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram for showing an example of configuration of a communication system according to embodiments of the present invention.

FIG. 4A is a block diagram for showing a software configuration of the image forming apparatus according to a first embodiment.

FIG. 4B depicts a view for showing an example of a screen in a case where a connection instruction module is realized by a button of an operation panel.

FIGS. 6A and 6B depict views for explaining examples of information that a DB stores according to the first embodiment.

FIG. 12 is a flowchart for describing processing of a child process of the server connector of the server computer according to the first embodiment.

FIG. 14 is a flowchart for describing processing of a protocol converter of the server computer according to the first embodiment.

FIG. 15A is a block diagram for explaining a software configuration of the image forming apparatus according to a second embodiment of the present invention.

FIG. 15B depicts a view for illustrating an example of device information that the device connector of the image forming apparatus transmits to the server connector according to the second embodiment.

FIG. 16A depicts a view for illustrating an example of a dynamic database that the DB of the server computer stores according to the second embodiment.

FIG. 16B depicts a view for illustrating an example of a screen displayed on the Web browser of the terminal device according to the second embodiment.

DESCRIPTION OF THE EMBODIMENTS

Figure 2:
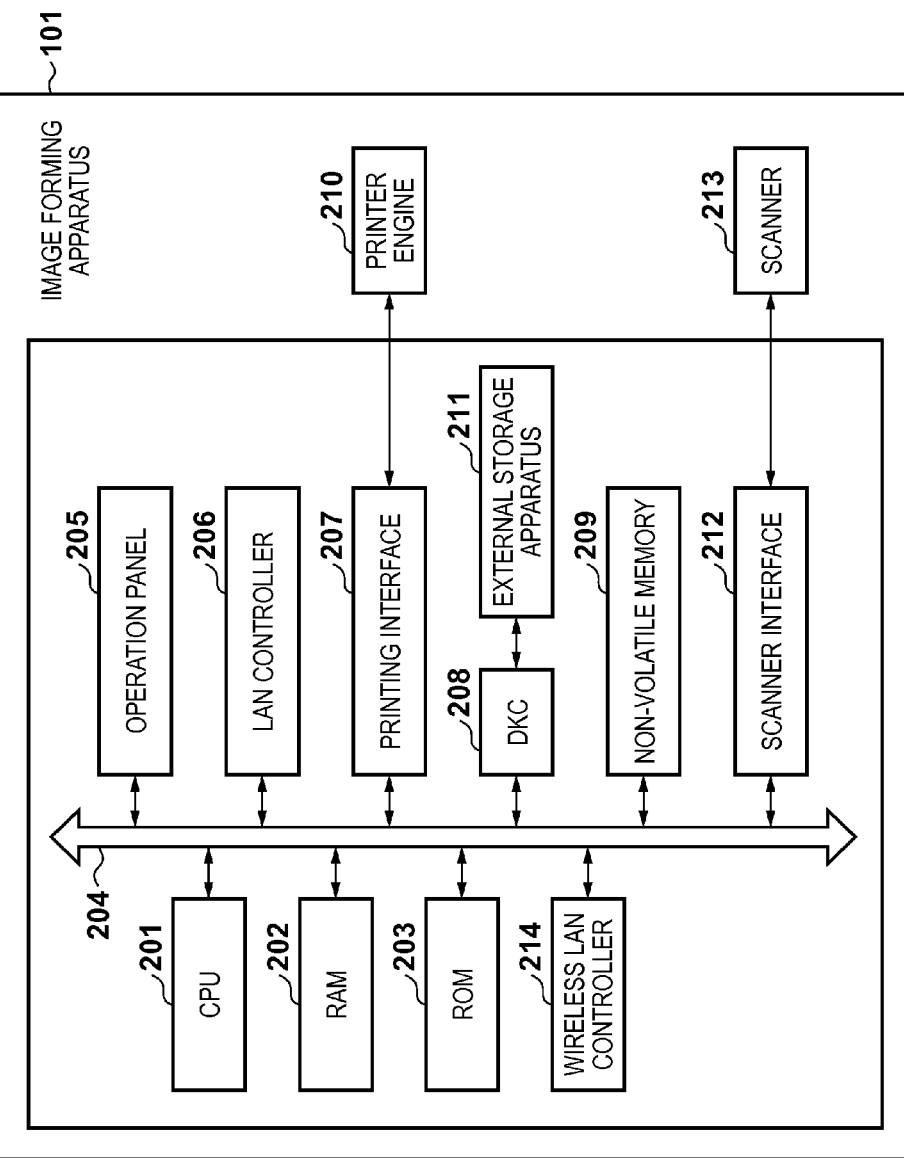
FIG. 2 is a block diagram for showing a hardware configuration of an image forming apparatus according to embodiments.

Embodiments of the present invention will now be described hereinafter in detail, with reference to the accompanying drawings. It is to be understood that the following embodiments is not intended to limit the claims of the present invention, and that not all of the combinations of the aspects that are described according to the following embodiments are necessarily required with respect to the means to solve the problems according to the present invention.

FIG. 1 is a block diagram for showing an example of configuration of a communication system according to embodiments of the present invention.

Image forming apparatuses 101, 102 are arranged in a user environment 110 and are able to access the Internet 140 via a network 104. Note, though not shown, there may be multiple user environments 110, and there may be more image forming apparatuses. A firewall 103 is installed between the user environment 110 and the Internet 140. The firewall 103 is configured so as to permit connections to the Internet 140 from an image forming apparatus inside of the user environment 110, and to reject connections to image forming apparatuses inside of the user environment 110 from the Internet 140.

A terminal device 120 is a smart phone, a cellular phone, a tablet, or a notebook type or a desktop type PC, for example, and in the embodiments, a serviceman has it, and it is able to access the Internet 140 using the terminal device 120. A server computer group 130 is a server group including a server computer (information processing apparatus) that provides a service via the Internet 140, and the server computer may be one machine or may be multiple machines. In FIG. 1, a server computer 131 is shown graphically as one machine.

In this kind of configuration, as will be explained later, a connection is established between the terminal device 120 and the image forming apparatuses 101 or 102, and remote operation of the image forming apparatuses 101, 102 is possible from the terminal device 120. Note, in the present embodiment, explanation is given with the image forming apparatus 101 for the image forming apparatuses 101, 102 collectively hereinafter because there is no difference in the characteristic processing between the image forming apparatuses 101, 102.

FIG. 2 is a block diagram for showing a hardware configuration of the image forming apparatus 101 according to the embodiments. Note, explanation will be given with the example of a copying machine.

A CPU 201 performs overall control of operation and access of each unit connected to a system bus 204 based on a control program stored in a ROM 203 or an external storage apparatus 211. Also, image signals are output to a printing unit (printer engine) 210 connected via a printing interface 207, and image signals are input from a reading unit (scanner) 213 connected via a scanner interface 212. Also, the CPU 201 is capable of communication processing with a terminal, another image forming apparatus, or the like on the network 104 via a LAN controller 206 or a wireless LAN controller 214. A RAM 202 mainly functions as a main memory of the CPU 201, a work area, or the like. The external storage apparatus 211, which is as a hard disk (HDD), an IC card, or the like, is controlled by a disk controller (DKC) 208, and is controlled to input data from the system bus 204, and to output data to the system bus 204. The external storage apparatus 211 stores application programs, font data, form data, or the like, and is used as a job storage area for externally controlling spooled jobs where print jobs are temporarily spooled. Furthermore, the external storage apparatus 211 holds image data input from the scanner 213 and image data of print jobs as box data, and the held data can be referenced from other communication apparatuses via the network 104. In the present embodiment, the external storage apparatus 211 is assumed to use an HDD, and hold various logs such as job logs, and image logs. An operation panel 205 comprises a touch panel and hard keys, and a user is able to input confirmation of a message, various information, or the like, via the operation panel 205. A non-volatile memory 209 stores various setting information set from a terminal, or the like, via the operation panel 205, the network 104, or the like.

Figure 3:
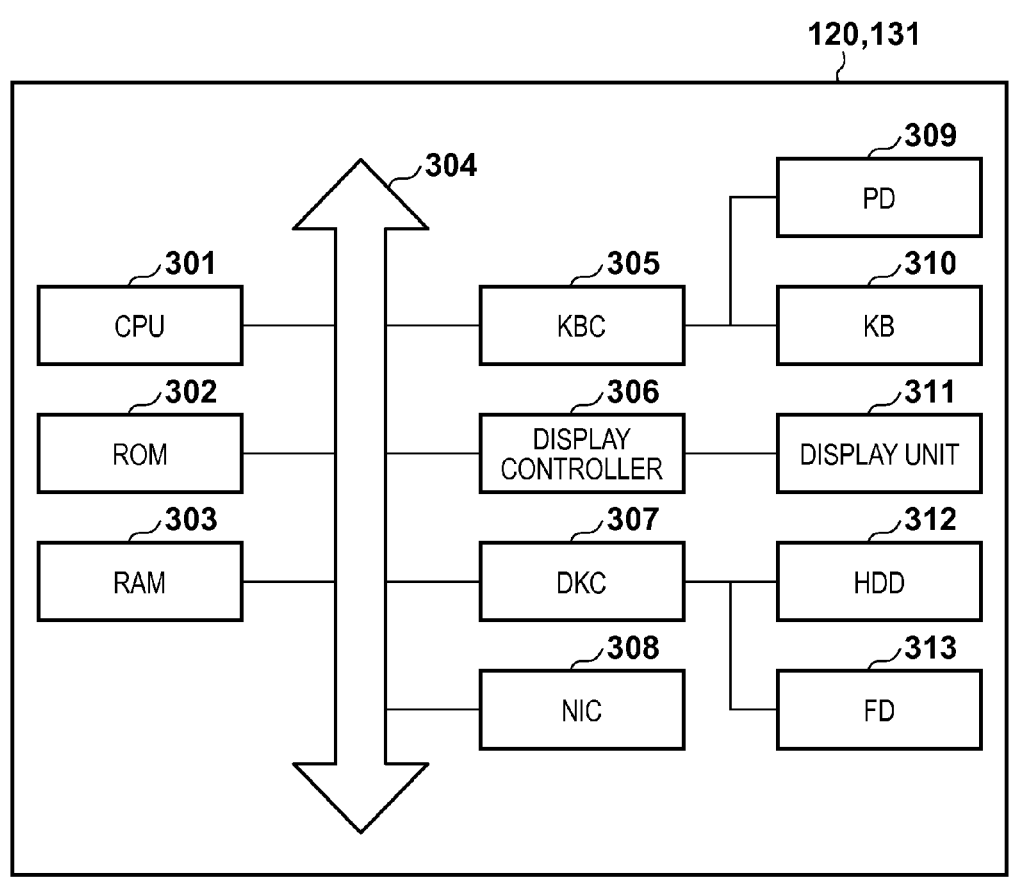
FIG. 3 is a block diagram for showing a hardware configuration of a terminal device and a server computer according to embodiments.

FIG. 3 is a block diagram for showing a hardware configuration of the terminal device 120 and the server computer 131 according to embodiments. Here, explanation will be given with a single drawing because the configurations of the terminal device 120 and the server computer 131 are common.

A CPU 301 controls various devices connected to a system bus 304. A ROM 302 stores a BIOS, a boot program, and the like. A RAM 303 is used as a main storage device of the CPU 301. A keyboard controller (KBC) 305, performs processing for input of information from a pointing device (PD) 309, and a keyboard (KB) 310. A display controller 306 has an internal video memory, and as well as rendering into the video memory in accordance with instructions from the CPU 301, the display controller 306 displays by outputting to a display unit 311 image data rendered into the video memory as a video signal. A disk controller (DKC) 307 controls access to a hard disk (HDD) 312, and a floppy (registered trademark) (FD) disk 313. A network interface card (NIC) 308 connects to a network, and performs communication with another device via the network. Note, in the HDD 312, an OS, various application programs that operate in the OS, and the like are stored. When an electric power supply of the apparatus is turned on, the CPU 301, in accordance with the boot program stored in the ROM 302, reads out the OS, programs, and the like, from the HDD 312 and deploys these into the RAM 303. Then, by the CPU 301 executing programs loaded into the RAM 303, the apparatus functions.

First Embodiment

FIG. 4A is a block diagram for showing a software configuration of the image forming apparatus 101 according to a first embodiment. Note, programs of the various processing sections (modules) in the block diagram are stored in the external storage apparatus 211, and functions are realized by deploying the programs into the RAM 202 and by the CPU 201 executing the programs.

A device connector 401 establishes a connection with a later described server connector 501 (FIG. 5) of the server computer 131 when the device connector 401 receives a connection instruction from a connection instruction module 402. Then, in a state in which the connection is maintained, the device connector 401 mediates communication between the server connector 501 which is a connection partner and a VNC server 403. The connection instruction module 402, upon an operation such as a button press of the operation panel 205 being performed by a user, transmits the connection instruction to the device connector 401. The VNC server 403 provides (service provision) a VNC server function, accepts a connection request when a new connection request is received, and transmits screen information of the operation panel 205 in accordance with the VNC protocol.

FIG. 4B depicts a view for showing an example of a screen in a case where the connection instruction module 402 is realized by a button of the operation panel 205 according to the first embodiment.

In FIG. 4B, a service button 410 is displayed on a display unit of the operation panel 205, and upon the user pressing the service button 410, a connection instruction is transmitted from the connection instruction module 402 to the device connector 401.

Figure 5:
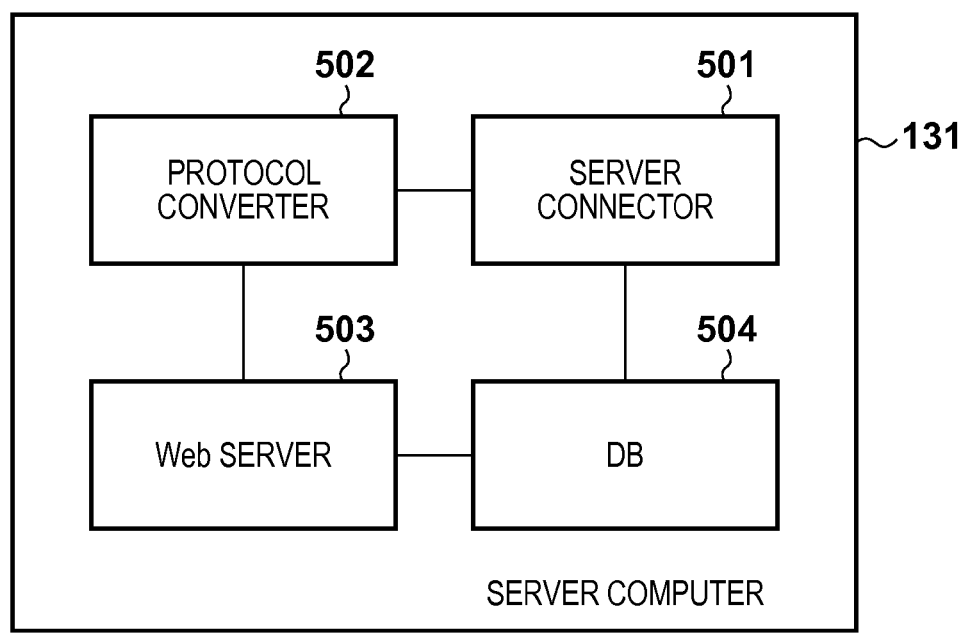
FIG. 5 is a block diagram for showing a software configuration of the server computer according to the first embodiment.

FIG. 5 is a block diagram for showing a software configuration of the server computer 131 according to the first embodiment. Note, programs of the various processing sections in the block diagram are stored in the HDD 312 of FIG. 3, and functions are realized by deploying the programs into the RAM 303 and by the CPU 301 executing the programs.

The server connector 501, when a connection instruction is received from the device connector 401 of the image forming apparatus 101 and a protocol converter 502, mediates communication between the device connector 401 and the protocol converter 502. A Web server 503 provides a Web server function to a Web browser 701 (FIG. 7) of the terminal device 120, and generates an initial screen when the Web browser first connects. Also, the Web server 503 transmits screen information that the protocol converter 502 converts, to the Web browser by the HTTP. The protocol converter 502 converts HTTP request data transmitted from the Web browser into the VNC protocol and outputs it to the server connector 501. Also, the protocol converter 502 converts data received from the server connector 501 by the VNC protocol into image data of a screen and outputs to the Web server 503. A DB (database) 504 stores information of the image forming apparatus 101, static information of a serviceman, or the like, responsible for a service of the image forming apparatus 101, dynamic information such as a current connection state with the image forming apparatus 101, and the like.

FIGS. 6A and 6B depicts views for explaining examples of information that the DB 504 stores according to the first embodiment.

FIG. 6A shows an example of a database of static information related to the image forming apparatus 101. The database is updated when an initiation, a termination, or the like, of a contract for support between manufacturer of the image forming apparatus 101 or a company that sells the image forming apparatus 101 and a customer is made. A serial number is the number that uniquely identifies the image forming apparatus 101. A model name is the model name of the image forming apparatus. A customer name is a name of the customer that receives support for the image forming apparatus, and a single customer may have a plurality of image forming apparatuses. A serviceman name is a name of a serviceman responsible for support of the image forming apparatus, and one serviceman may be responsible for a plurality of image forming apparatuses.

FIG. 6B shows an example of a database of dynamic information relating to a current connection state with the image forming apparatus 101. The database, as will be later described, is updated in a case where the server connector 501 connects or disconnects communication from the device connector 401, the Web server 503, or the like. Regarding the serial number, the model name, and the customer name, when the server connector 501 receives information of the image forming apparatus 101 from the device connector 401, they are copied specifying the corresponding image forming apparatus from out of the database of FIG. 6A. A connection date indicates a date and time when the server connector 501 connected to the device connector 401 (the image forming apparatus 101). A serviceman connection date indicates a date and time when the server connector 501 is connected to from the protocol converter 502. In a case where a connection is established between the Web browser 701 (FIG. 7) of a corresponding serviceman name and the terminal device 120, and the VNC server 403, the name of the serviceman that connected is stored. In this way, by managing information relating to a connection state between the image forming apparatus 101 and a terminal device, a case in which, after a communication connection between the image forming apparatus 101 and the server computer 131 is established, the serviceman (the terminal device 120) does not connect even though a predetermined interval elapses can be distinguished.

Figure 7:
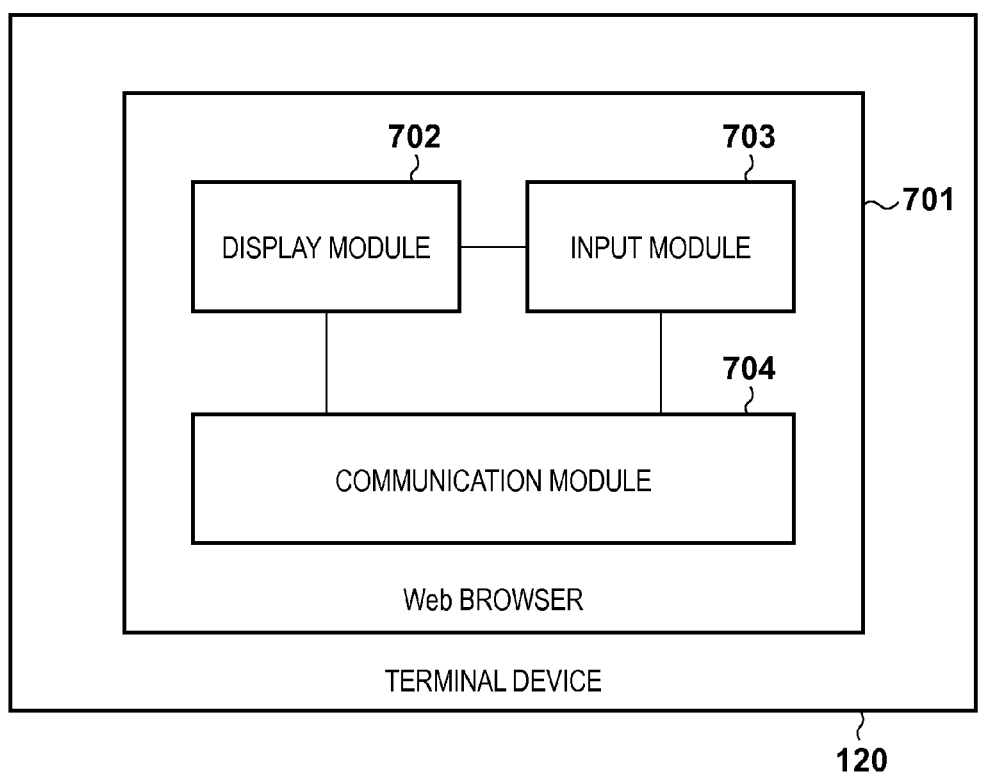
FIG. 7 is a block diagram for showing a software configuration of the terminal device according to the first embodiment.

FIG. 7 is a block diagram for showing a software configuration of the terminal device 120 according to the first embodiment. Note, a program of the various processing sections in the block diagram is stored in the HDD 312 of FIG. 3, and functions are realized by deploying the program into the RAM 303 and by the CPU 301 executing the program.

The Web browser 701 is a general Web browser application, and includes a display module 702, an input module 703, and a communication module 704. When the input module 703 receives an input from a user, the communication module 704 transmits it to the Web server as an HTTP request, and when the response is received, the display module 702 interprets and displays the response. In the first embodiment, a user input is transmitted to the Web server 503 of the server computer 131 as input information input by a key or a mouse.

Figure 8:
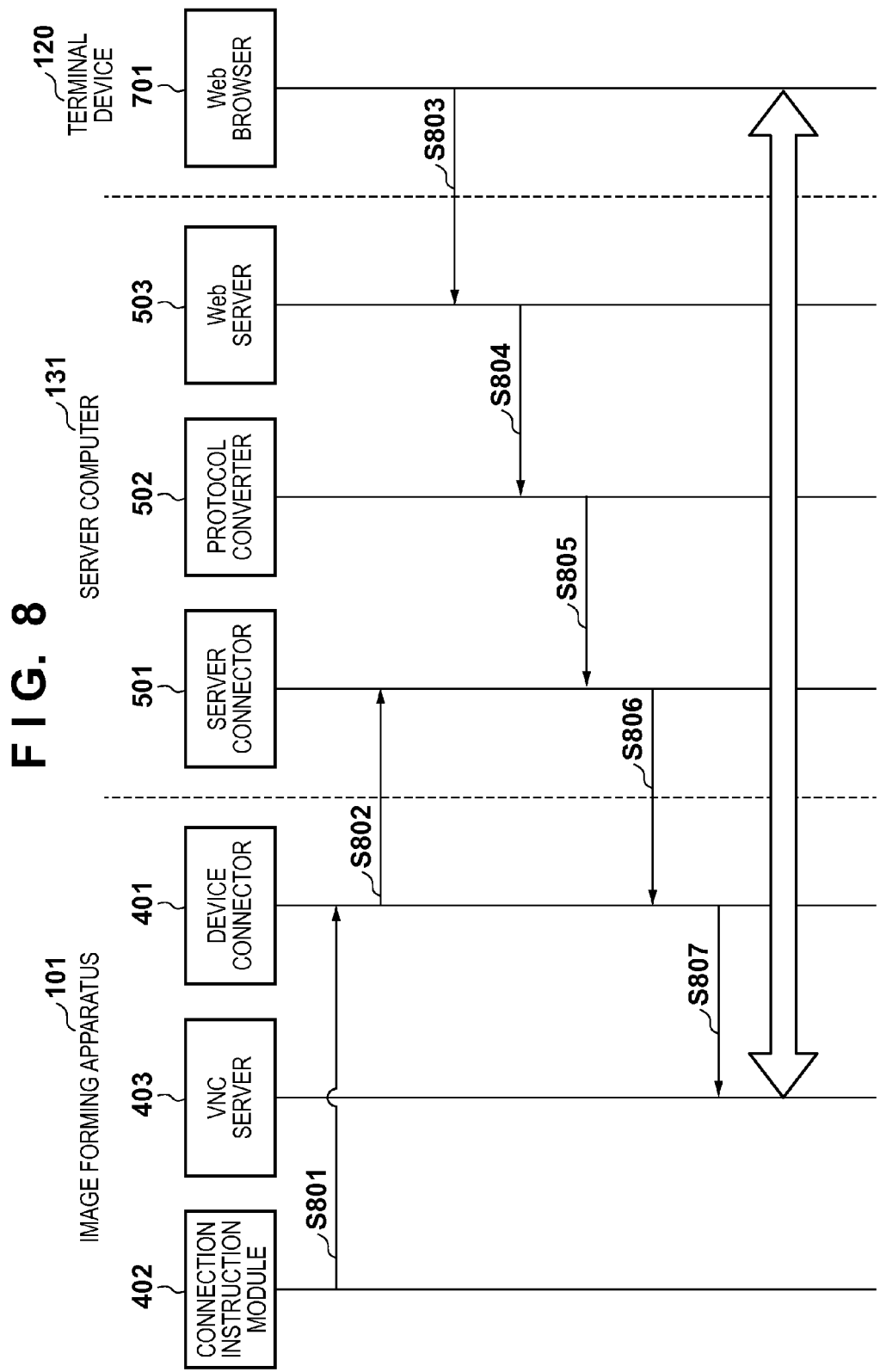
FIG. 8 is a sequence diagram for explaining a flow of processing up until a connection between a Web browser of the terminal device and a VNC server of the image forming apparatus is established.

FIG. 8 is a sequence diagram for explaining a flow of processing up until a connection is established between the Web browser 701 of the terminal device 120 and the VNC server 403 of the image forming apparatus 101.

In step S801, upon, for example, the service button 410 being pressed on the image forming apparatus 101, the connection instruction module 402 transmits a connection instruction to the device connector 401. Next, in step S802, the device connector 401 of the image forming apparatus 101 connects to the server connector 501 of the server computer 131, and transmits information such as a device name of the image forming apparatus 101. With this, the server connector 501 registers the information, which is the device name that is received into the DB 504, or the like.

Next, in step S803, when the Web browser 701 of the terminal device 120 connects to the Web server 503 of the server computer 131, the Web server 503 transmits information registered into the DB 504 to the Web browser 701 of the terminal device 120. Then, the Web browser 701 transmits a connection request to the VNC server 403 of the image forming apparatus 101. In step S804, the Web server 503 makes a notification to the protocol converter 502 of the connection request to the VNC server 403. With this, in step S805, the protocol converter 502 connects to the server connector 501. Then, in step S806, the server connector 501 transmits the connection request for the VNC server 403 to the device connector 401 of the image forming apparatus 101 using the connection with the image forming apparatus 101 established in step S802. With this, in step S807 the device connector 401 connects to the VNC server 403 in response to the connection request.

By the above processing, a connection between the Web browser 701 of the terminal device 120 and the VNC server 403 of the image forming apparatus 101 is established, and thereafter, communication by the VNC protocol between the image forming apparatus 101 and the terminal device 120 becomes possible.

Figure 9:
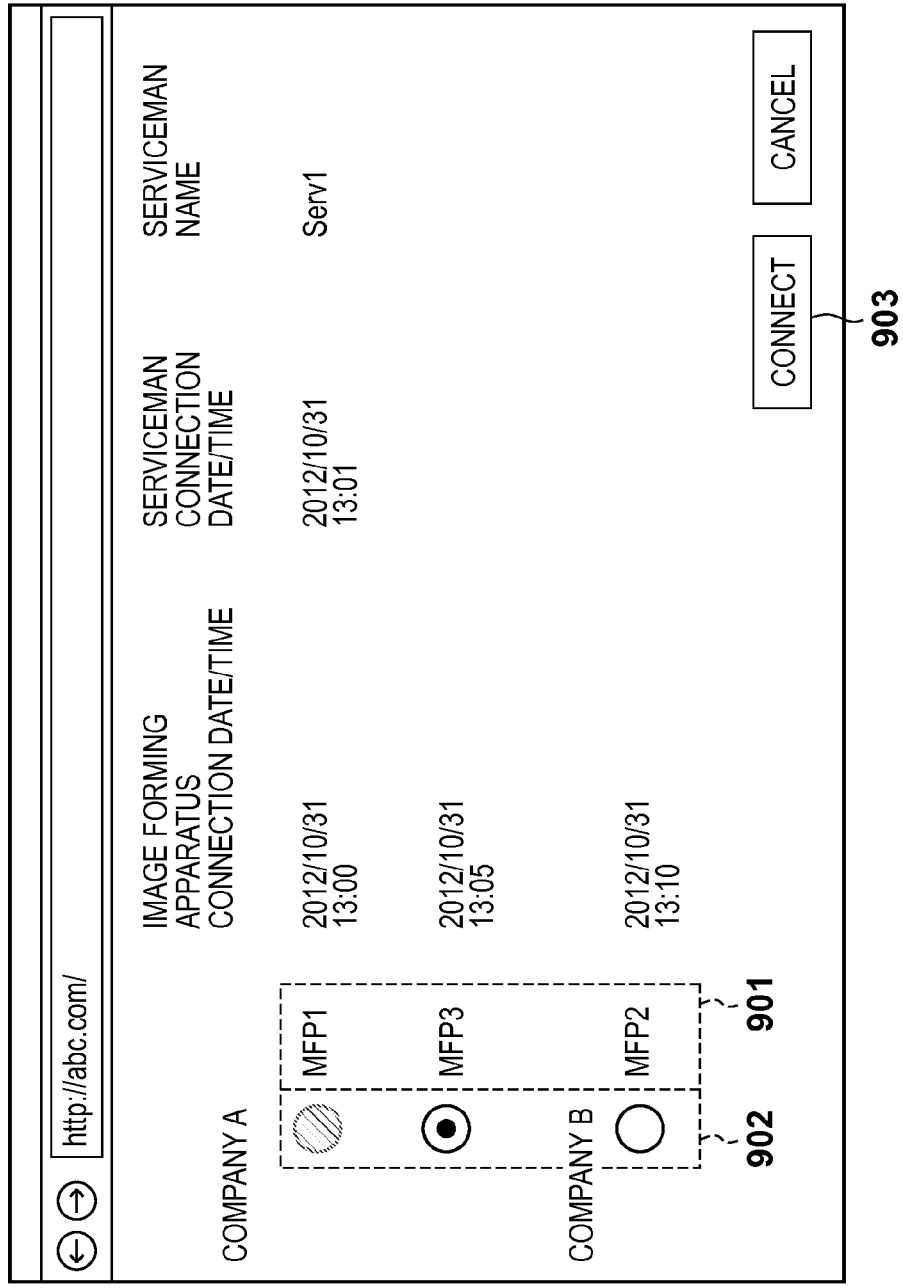
FIG. 9 depicts a view for showing an example of a screen displayed on the Web browser of the terminal device in step S803 of FIG. 8.

FIG. 9 depicts a view for showing an example of a screen displayed on the Web browser 701 of the terminal device 120 in step S803 of FIG. 8.

In the DB 504 of the server computer 131, along with a serial number of the image forming apparatus 101, a company name of a customer is registered, and in a device name 901, a model name of the image forming apparatus 101, is displayed grouped by a company name. When, in this screen, a serviceman that has the terminal device 120 selects a check-box 902 of the device name for which he or she wishes to connect, and presses a connection button 903, a connection request is transmitted to the VNC server 403 of the image forming apparatus 101. Note, in FIG. 9, for an MFP 1 of a company A, a serviceman "serv1" is already connected, and because the image forming apparatus (MFP 1) cannot be connected to, the check-box 902 of the MFP 1 is grayed out. In FIG. 9, a connection to an MFP 3 of the company A is instructed by the serviceman.

Figure 10:
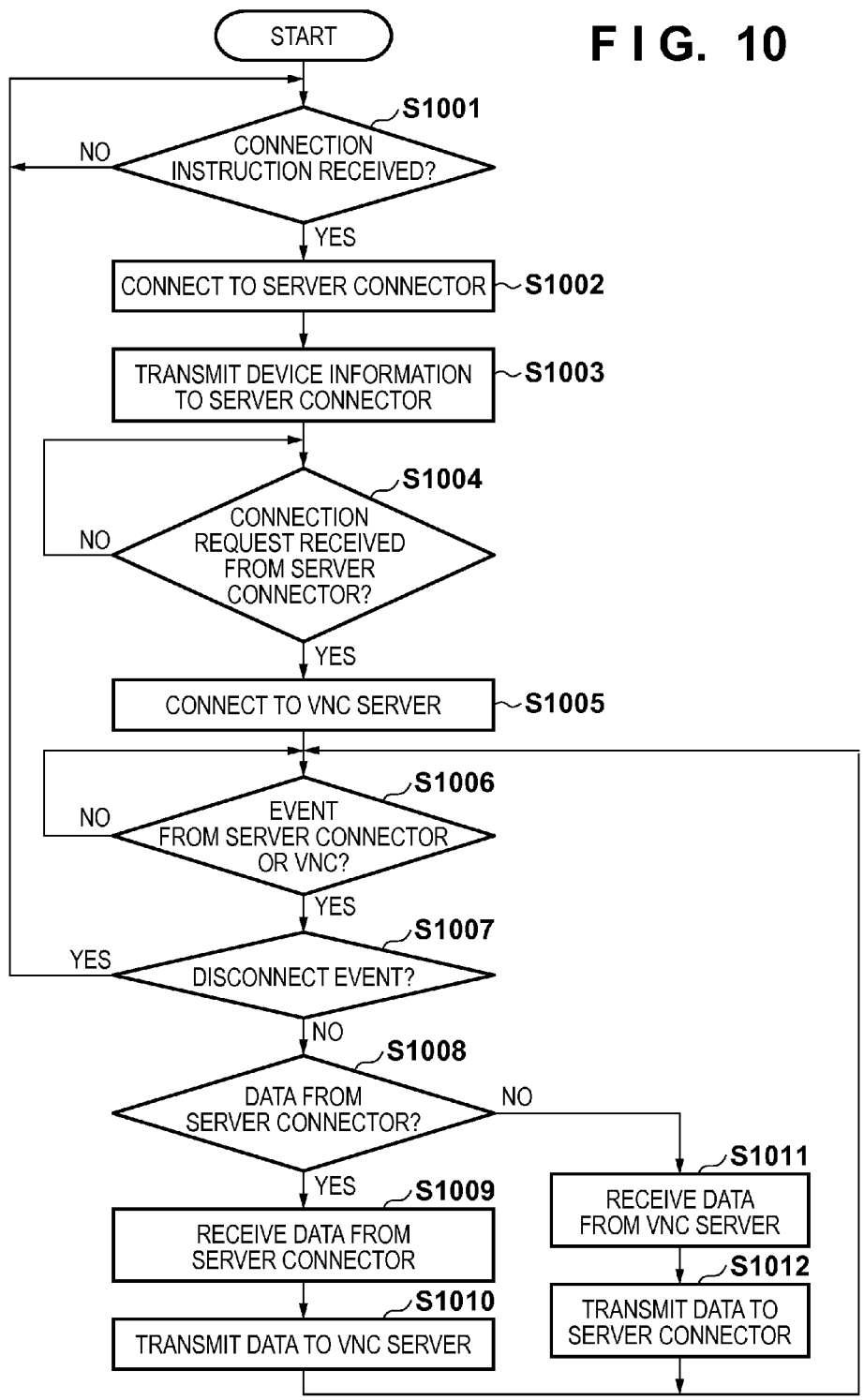
FIG. 10 is a flowchart for describing processing of a device connector of the image forming apparatus according to the first embodiment.

FIG. 10 is a flowchart for describing processing of the device connector 401 of the image forming apparatus 101 according to the first embodiment. A program that executes this processing is stored in the external storage apparatus 211, and the processing is realized by deploying the program into the RAM 202 and by the CPU 201 executing the program.

Figures 11A, 11B, 11C:
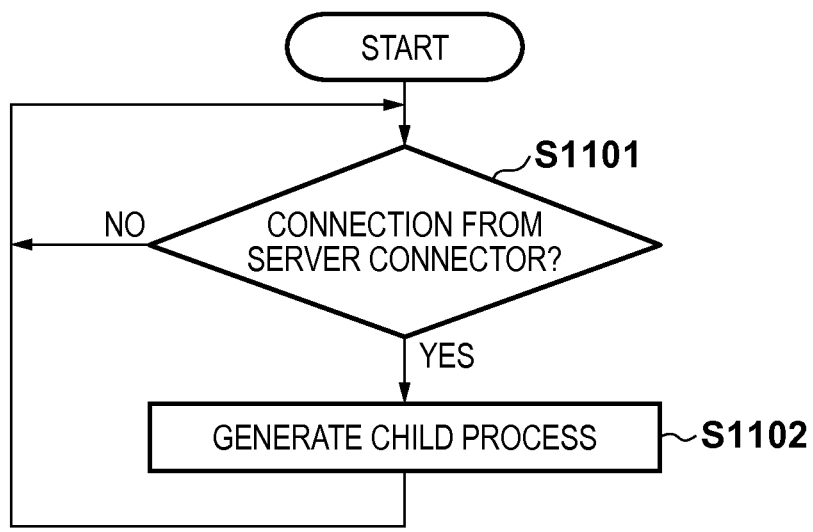
FIG. 11A depicts a view for illustrating an example of device information that the device connector transmits to a server connector.
FIG. 11B depicts a view for illustrating an example of a VNC connection request that the device connector receives from the server connector.
FIG. 11C is a flowchart for describing processing of a parent process of the server connector according to the first embodiment.

Firstly, in step S1001, the device connector 401 waits until a connection instruction is received from the connection instruction module 402 of the image forming apparatus 101. When the connection instruction is received, the processing proceeds to step S1002, and the device connector 401 connects to the server connector 501 of the server computer 131. Next, the processing proceeds to step S1003, and the device connector 401 transmits device information as shown in FIG. 11A to the server connector 501. In FIG. 11A, in accordance with previously described FIG. 9, a connection request including a serial number "SN004", and a model name "MFP 3" is shown.

After this, the processing proceeds to step S1004, and the device connector 401 waits until a VNC connection request as shown in FIG. 11B is received from the server connector 501 of the server computer 131. When, in step S1004, the VNC connection request is received, the processing proceeds to step S1005, and the device connector 401 connects to the VNC server 403. With this, a connection between the image forming apparatus 101 and the server computer 131 is established, and when the terminal device 120 connects to the server computer 131 via the Web browser 701, communication by the VNC protocol between the image forming apparatus 101 and the terminal device 120 becomes possible.

Next, the processing proceeds to step S1006, and the device connector 401 waits for a data reception or a connection disconnect event from the server connector 501 of the server computer 131 or the VNC server 403. When such an event occurs, the processing proceeds to step S1007, and the device connector 401 determines whether or not the event is a connection disconnect event, and when it is, the processing returns to step S1001. On the other hand, when the event is not the connection disconnect event, the processing proceeds to step S1008, and the device connector 401 determines whether or not the event is a data reception event from the server connector 501 of the server computer 131. If it is, the processing proceeds to step S1009, and the device connector 401 receives data from the server connector 501 of the server computer 131. Next, the processing proceeds to step S1010, and the device connector 401 transmits the data received in step S1009 to the VNC server 403 and the processing returns to step S1006. With this, it is possible to reflect the operation via the operation screen in the terminal device 120 in the operation panel 205 of the image forming apparatus 101.

Meanwhile, in a case where the event is not a data reception event from the server connector 501 in step S1008, the processing proceeds to step S1011, and the device connector 401 receives data from the VNC server 403 of the image forming apparatus 101. Next, the processing proceeds to step S1012, the device connector 401 transmits the data received in step S1011 to the server connector 501 of the server computer 131, and the processing returns to step S1006. With this, it is possible to reflect the operation via the operation screen of the image forming apparatus 101 in the operation screen of the terminal device 120.

With this processing, when the service button 410 is pressed, for example, on the operation panel 205 of the image forming apparatus 101, it is possible to connect to the server computer 131. Then, when the terminal device 120 connects to the server computer 131 by the Web browser in a state in which the connection is maintained, communication can be performed by the VNC protocol between the image forming apparatus 101 and the terminal device 120.

FIG. 11A and FIG. 11B depict views for illustrating examples of information transmitted between the device connector 401 of the image forming apparatus 101 and the server connector 501 of the server computer 131 according to embodiments.

FIG. 11A depicts a view for illustrating an example of device information that the device connector 401 transmits to the server connector 501. Here, the serial number (SN0004) is a serial number of the image forming apparatus 101 (MFP 3), and the server connector 501 of the server computer 131 is able to identify the corresponding image forming apparatus 101 from the DB 504 of the server computer 131.

FIG. 11B depicts a view for illustrating an example of a VNC connection request that the device connector 401 of the image forming apparatus 101 receives from the server connector 501 of the server computer 131.

Next, explanation will be given for the server connector 501 of the server computer 131. The server connector 501 includes a parent process that only waits on a connection request from the image forming apparatus 101, and a child process that actually performs the communication with each image forming apparatus 101 in order to enable simultaneous connections with a plurality of the image forming apparatuses 101.

FIG. 11C is a flowchart for describing processing of the parent process of the server connector 501 of the server computer 131 according to the first embodiment. A program for executing this processing is stored in the HDD 312 of the server computer 131, is read out into the RAM 303 upon execution, and is executed under the control of the CPU 301.

Firstly, in step S1101, the server connector 501 waits until it is connected to from the device connector 401 of the image forming apparatus 101. When it is connected to the device connector 401, the processing proceeds to step S1102, and the server connector 501 generates a child process, and after that, the processing returns to step S1101.

FIG. 12 is a flowchart for describing processing of the child process of the server connector 501 of the server computer 131 according to the first embodiment. Note, this processing is realized by a program for executing this processing being stored in the HDD 312 of the server computer 131, being loaded into the RAM 303 upon execution, and the CPU 301 executing the program.

Firstly, in step S1201, the server connector 501 receives device information such as that in FIG. 11A from the device connector 401 of the image forming apparatus 101. Next, the processing proceeds to step S1202, and the server connector 501 searches the static database (FIG. 6A) by extracting the serial number of the image forming apparatus from the received device information, and updates the dynamic database (FIG. 6B) based on the result. Next, the processing proceeds to step S1203, and the server connector 501 waits for it to be connected to from the protocol converter 502 of the server computer 131. This is something that is based on a connection request from the terminal device 120 by a serviceman. When it is connected to, the processing proceeds to step S1204, and the server connector 501 updates the serviceman connection date of the dynamic database of the DB 504 to the current time. Next, the processing proceeds to step S1205, and the server connector 501 transmits a VNC connection request such as in FIG. 11B to the device connector 401 of the image forming apparatus 101.

Next, the processing proceeds to step S1206, and the server connector 501 waits for a data reception or a connection disconnect event from the device connector 401 of the image forming apparatus 101 or the protocol converter 502 of the server computer 131. When an event occurs, the processing proceeds to step S1207, and the server connector 501 determines whether or not the event is a connection disconnect event, and if it is, the processing proceeds to step S1208, and the server connector 501 deletes the information of the image forming apparatus 101 from the dynamic database and completes the processing.

Meanwhile, when the event is not the connection disconnect event in step S1207, the processing proceeds to step S1209, and the server connector 501 determines whether or not the event is a data reception event from the device connector 401, i.e. from the image forming apparatus 101, and if it is, the processing proceeds to step S1210. In step S1210, the server connector 501 receives data from the device connector 401 of the image forming apparatus 101. Next, the processing proceeds to step S1211, and the server connector 501 transmits the data received in step S1210 to the protocol converter 502, and the processing returns to step S1206. Meanwhile, in a case where in step S1209 the event is not a data reception event from the device connector 401, the processing proceeds to step S1212, and the server connector 501 receives data from the protocol converter 502. Next, the processing proceeds to step S1213, and the server connector 501 transmits the data received in step S1212 from the terminal device 120 to the device connector 401 of the image forming apparatus 101, and the processing returns to step S1206.

By this processing, the server computer 131 updates the DB 504 when device information is received from the image forming apparatus 101, and when data is received from the Web browser 701 of the terminal device 120, the server computer 131 updates the DB 504 and also converts to the VNC protocol. In this way, communication by the VNC protocol between the image forming apparatus 101 and the terminal device 120 can be mediated.

Figure 13:
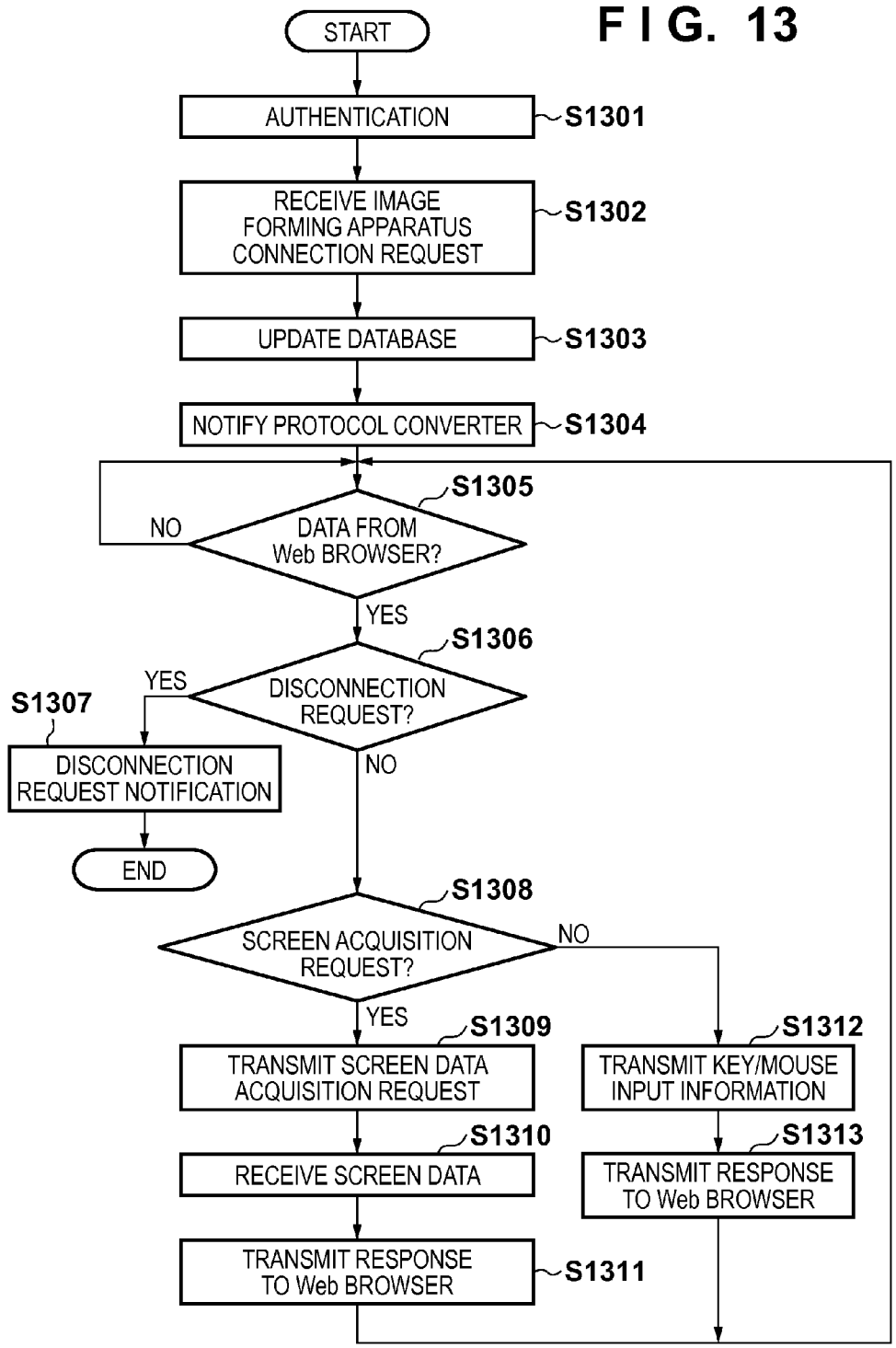
FIG. 13 is a flowchart for describing processing of a Web server of the server computer according to the first embodiment.

FIG. 13 is a flowchart for describing processing of the Web server 503 of the server computer 131 according to the first embodiment. Note, this processing is realized by a program for executing this processing being stored in the HDD 312 of the server computer 131, being deployed into the RAM 303 upon execution, and the CPU 301 executing the program.

Firstly, in step S1301, the Web server 503 receives a connection request from the Web browser 701 of the terminal device 120, and performs an authentication. Next, the processing proceeds to step S1302, and the Web server 503, upon a serviceman selecting an image forming apparatus in the screen of FIG. 9 for example, and pressing the connection button 903, receives a connection request from the Web browser 701 of the terminal device 120 to connect to the image forming apparatus 101. Next, the processing proceeds to step S1303, and the Web server 503 updates the serviceman name of the image forming apparatus selected from out of the dynamic database of FIG. 6B using the information authenticated in step S1301. Next, the processing proceeds to step S1304, and the Web server 503 makes a notification to the protocol converter 502 so that the protocol converter 502 converts the HTTP request data is transmitted from the Web browser 701 into the VNC protocol and outputs to the server connector 501. Also, the Web server 503 makes a notification so that the protocol converter 502 converts the data received from the server connector 501 by the VNC protocol into image data of a screen and outputs to the Web server 503.

After this, the processing proceeds to step S1305, and the Web server 503 waits until the Web server 503 receives data from the Web browser 701 of the terminal device 120. When the Web server 503 receives data from the Web browser 701, the processing proceeds to step S1306, and the Web server 503 determines whether or not the data received from the terminal device 120 is a disconnection request. If it is, the processing proceeds to step S1307, the Web server 503 transmits a disconnection request to the protocol converter 502, and the process is terminated. Meanwhile, in a case where it is determined that it is not a disconnection request in step S1306, the processing proceeds to step S1308, and the Web server 503 determines whether or not the data received is a screen data acquisition request. If it is, the processing proceeds to step S1309, and the Web server 503 transmits a screen data acquisition request to the protocol converter 502. Next, the processing proceeds to step S1310, and the Web server 503 receives screen data of the image forming apparatus 101 received by the VNC protocol from the protocol converter 502 as a response in response to the screen data acquisition request. Next, the processing proceeds to step S1311, and the Web server 503 transmits the screen data received in step S1310 to the Web browser 701 of the terminal device 120 and the processing returns to step S1305.

Meanwhile, in a case where it is not the screen data acquisition request in step S1308, the processing proceeds to step S1312, and the Web server 503 transmits input information of a key/mouse included in data received from the Web browser 701 of the terminal device 120 to the protocol converter 502. With this, input information of a key/mouse from the terminal device 120 is transmitted to the image forming apparatus 101 by the server connector 501. After this, the processing proceeds to step S1313, and the Web server 503 transmits the response to the Web browser 701 of the terminal device 120 and the processing returns to step S1305.

By this processing, an operation screen of the operation panel 205 of the image forming apparatus 101 can be obtained and displayed on the terminal device 120, and operation information received from the Web browser 701 of the terminal device 120 is transmitted to the image forming apparatus 101 and displayed on the operation screen of the operation panel 205.

FIG. 14 is a flowchart for describing processing of the protocol converter 502 of the server computer 131 according to the first embodiment. Note, this processing is realized by a program for executing this processing being stored in the HDD 312 of the server computer 131, being deployed into the RAM 303 upon execution, and the CPU 301 executing the program.

Firstly, in step S1401, the protocol converter 502 waits for a notification from the Web server 503. When the notification is received, the processing proceeds to step S1402, and the protocol converter 502 connects to the server connector 501. After this, the processing proceeds to step S1403, and the protocol converter 502 waits for either a predetermined time to elapse or for a data reception event from the Web server 503. When an event occurs, the processing proceeds to step S1404, and the protocol converter 502 determines whether or not the event is an event for the predetermined time elapsing, and if it is, the processing proceeds to step S1405. In step S1405, the protocol converter 502 performs data transmission and receiving with the server connector 501 using the VNC protocol, and acquires screen information of the image forming apparatus 101. Next, the processing proceeds to step S1406, and the protocol converter 502 generates and holds screen data from the received screen information, and the processing returns to step S1403.

Meanwhile, in a case where the event is not an event for the predetermined time elapsing in step S1404, the processing proceeds to step S1407, and the protocol converter 502 determines whether or not the data received is a screen data acquisition request, and if it is, the processing proceeds to step S1408. In step S1408, the protocol converter 502 transmits the held screen data to the Web server 503 and the processing returns to step S1403. With this, the Web browser 701 of the terminal device 120 acquires the screen data and displays the screen. Meanwhile, in a case where the received data is not the screen data acquisition request in step S1407, the processing proceeds to step S1409, the protocol converter 502 transmits key/mouse input information to the server connector 501 using the VNC protocol, and the processing returns to step S1403. With this, the image forming apparatus 101 is able to acquire key input information in the terminal device 120, or the like, and reflect it in the operation screen of the operation panel 205.

By the first embodiment, as explained above, a connection between the image forming apparatus 101 and the server computer 131 is established in accordance with a connection request from the image forming apparatus 101 within a firewall. After this, when the terminal device 120 connects with the server computer 131 by the Web browser 701, the server computer 131 converts the HTTP request data transmitted from the Web browser 701 into the VNC protocol. In this way, information from the terminal device 120 is transmitted to the image forming apparatus 101. Also, data received from the image forming apparatus 101 in the VNC protocol can be converted into image data of a screen, output to the Web server 503 and transmitted to the terminal device 120. In this way, it becomes possible to perform communication by the VNC protocol between the image forming apparatus 101, which is within a firewall, and the terminal device 120 connected to a server computer on the Internet.

Second Embodiment

Next, explanation will be given for a second embodiment of the present invention. In the previously described first embodiment, the connection instruction module 402 is the button 903 of the operation panel 205 of the image forming apparatus 101, and the user makes a connection instruction by pressing the button 903. In this embodiment, a connection instruction is performed upon a jam or a toner outage error occurrence. With this, there is the effect that it is possible to allow the device connector 401 of the image forming apparatus 101 to connect with the server connector 501 automatically when an error occurs without the user performing an operation. Note, in the second embodiment, explanation relating to identical part to the first embodiment is omitted, and only explanation of differences is given.

FIG. 15A is a block diagram for explaining a software configuration of an image forming apparatus 101 according to the second embodiment of the present invention. Note, a program of the various processing sections in the block diagram is stored in the external storage apparatus 211, and functions are realized by deploying the program into the RAM 202 and by the CPU 201 executing the program. Note, in FIG. 15A, portions common to the previously described FIG. 4A are shown with the same reference numerals, and their explanation will be omitted.

An error detection module 1501 makes a notification to the connection instruction module 402 when the error detection module 1501 detects an occurrence of an error of the image forming apparatus 101 caused by a change of status such as a jam, a toner outage, or the like. The connection instruction module 402 transmits a connection instruction to the device connector 401 when the connection instruction module 402 receives a notification from the error detection module 1501.

FIG. 15B depicts a view for illustrating an example of device information that the device connector 401 of the image forming apparatus 101 transmits to the server connector 501 of the server computer 131 according to the second embodiment of the present invention.

A priority level 1510 is a numeral for determining based on a type of the error that occurred, and "1" has the meaning of having the highest priority level, and that it is necessary that immediate support of a serviceman be received. A status 1511 indicates the type of the error that actually occurred. Here, it is showing that the most serious error having the highest priority level occurred.

FIG. 16A depicts a view for illustrating an example of a dynamic database that the DB 504 of the server computer 131 stores according to the second embodiment.

Here, the priority level and the status are added to the dynamic database of FIG. 6B, and in the priority level and the status, information received from the device connector 401 is stored.

FIG. 16B depicts a view for illustrating an example of a screen displayed on the Web browser 701 of the terminal device 120 according to the second embodiment.

The display is changed in accordance with the priority level stored in the dynamic database shown in FIG. 16A and the state information. In the example of FIG. 16B, display of image forming apparatuses having high priority level is made to stick out by changing the background color.

By the second embodiment, as explained above, in accordance with an occurrence of an error in the image forming apparatus 101, it is possible to connect the image forming apparatus and the server computer 131 automatically. Also, by setting the priority level corresponding to the type of the error, handling in accordance with the type of the error becomes possible.

Third Embodiment

Next, explanation will be given for a third embodiment. In the previously described first embodiment, the connection instruction module 402 is the button 903 of the operation panel 205, and the user issued a connection instruction by pressing the button 903. Also, in the second embodiment, when an occurrence of an error is detected within the image forming apparatus 101, a connection instruction is issued. In contrast to this, in the third embodiment, configuration is taken such that a connection instruction is issued upon a trigger from outside of the image forming apparatus 101. With this, there is the effect that it becomes possible for a serviceman, at an arbitrary timing, to connect the device connector 401 of the image forming apparatus 101 and the server connector 501. Note, in the third embodiment, explanation relating to parts identical to the first embodiment is omitted, and only explanation of differences is given.

Figure 17:
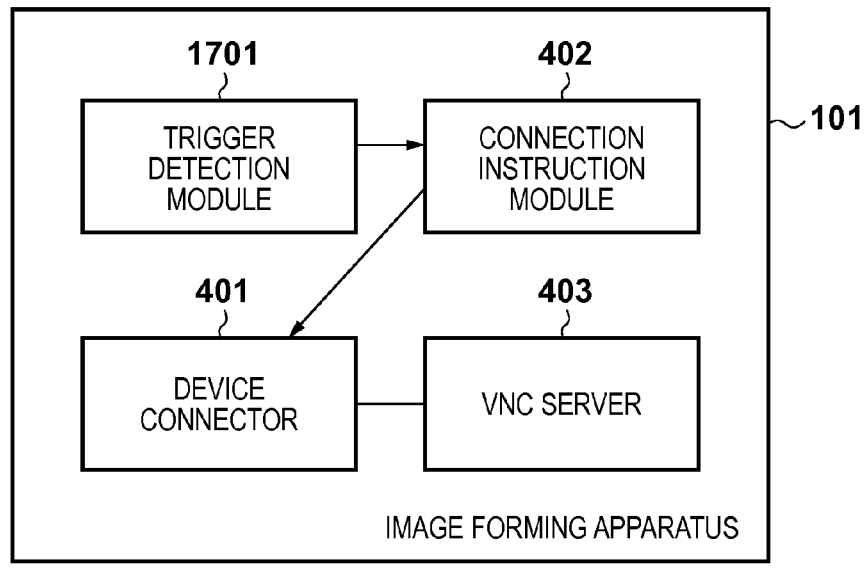
FIG. 17 is a block diagram for explaining a software configuration of the image forming apparatus according to a third embodiment of the present invention.

FIG. 17 is a block diagram for explaining a software configuration of an image forming apparatus 101 according to a third embodiment of the present invention. Note, a program of the various processing sections in the block diagram is stored in the external storage apparatus 211, and functions are realized by deploying the program into the RAM 202 and by the CPU 201 executing the program. Note, in FIG. 17, portions common to the previously described FIG. 4A are shown with the same reference numerals, and their explanation will be omitted.

A trigger detection module 1701 receives a connection request from a serviceman and makes a notification to the connection instruction module 402. The connection instruction module 402 transmits a connection instruction to the device connector 401 when the connection instruction module 402 receives a notification from the trigger detection module 1701. As an example of the trigger detection module 1701, there is an electronic mail reception function. When the serviceman transmits an electronic mail in which a connection request is defined to an electronic mail address of the image forming apparatus 101, the electronic mail reception function receives the electronic mail, and interprets that it is a connection request. Also, as another example of the trigger detection module 1701, an incoming call function using a telephone line such as a FAX may be used. When a connection request is received by the serviceman calling a telephone number of a telephone that the image forming apparatus 101 has and performing an authentication, interpreting is possible.

As explained above, by virtue of the third embodiment, it is possible to connect the image forming apparatus 101 and the server computer 131 automatically in accordance with a connection request such as that of an electronic mail, an incoming call, or the like, from a serviceman. With this, special operation for connecting with the server computer 131 in the image forming apparatus 101 becomes unnecessary. Also, there is the effect that it becomes possible to communicate by the VNC protocol with the image forming apparatus 101 without a remote serviceman going to the location of the image forming apparatus 101, or without requesting another person to operate the image forming apparatus 101.

Fourth Embodiment

Next, explanation will be given for a fourth embodiment of the present invention. In the fourth embodiment, configuration is taken such that the server computer 131 does not have a protocol converter, and instead the terminal device 120 has a VNC viewer and a client connector. Also, configuration is taken such that the device connector 401 of the image forming apparatus 101 connects to the server connector via the Web server of the server computer 131. Also, a server connector 1801 (FIG. 18) of the server computer 131 includes a Web server function, and it is assumed that the device connector 401 and the server connector, and the client connector and the server connector each perform communication by the HTTP.

Figure 18:
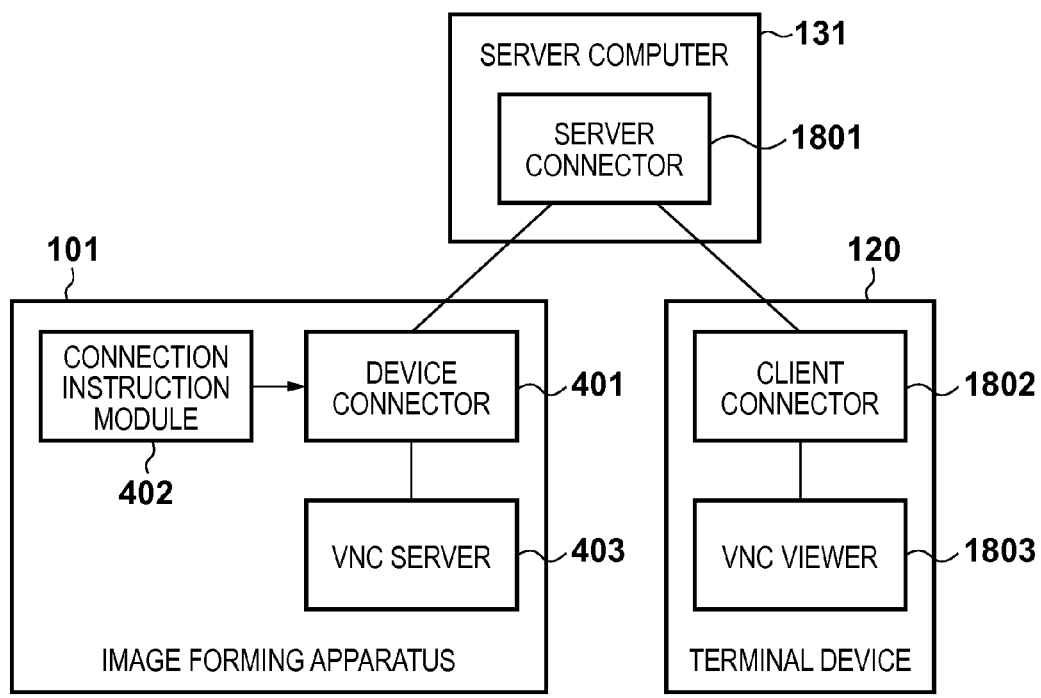
FIG. 18 is a block diagram for explaining a software configuration diagram of the image forming apparatus, the server computer, and the terminal device according to a fourth embodiment.

FIG. 18 is a block diagram for explaining a software configuration diagram of the image forming apparatus 101, the server computer 131 and the terminal device 120 according to the fourth embodiment. Note, a program of the processing modules of the image forming apparatus 101 is stored in the external storage apparatus 211 of FIG. 2, deployed into the RAM 202, and executed by the CPU 201. Also, a program of the processing modules of the server computer 131 and the terminal device 120 is stored in the HDD 312 of FIG. 3, deployed into the RAM 303, and executed by the CPU 301. For the image forming apparatus 101, because the same configuration is taken as in FIG. 4A of the first embodiment, the same numbers are used, and explanation is omitted. Note, as described above, the device connector 401 is connected to the server connector 1801 via the Web server of the server computer 131.

In the fourth embodiment, the server connector 1801 of the server computer 131 includes a Web server function, and has a function for returning a response in response to a request from a Web browser, some other HTTP client, or the like. A client connector 1802 of the terminal device 120 mediates communication between the server connector 1801 of the server computer 131 and a VNC viewer 1803. The VNC viewer 1803 has a function for transmitting key/mouse input information to the VNC server 403 via the server computer 131, and displaying screen information received from the VNC server 403, and here a service provided by the VNC server 403 of the image forming apparatus 101 is used.

Next, explanation will be given for HTTP communication that is performed between the server connector 1801 of the server computer 131 and the device connector 401 of the image forming apparatus 101, and the server connector 1801 and the client connector 1802 of the terminal device 120.

HTTP is a client/server type protocol defined in RFC 2616, and it has a plurality of methods. In general, in a case where a client receives information from a server, a GET method is used, and in a case where information is transmitted to a server from a client, a POST method is used. In the fourth embodiment, the device connector 401 of the image forming apparatus 101 uses the POST method when transmitting data to the server connector 1801 of the server computer 131. For example, screen information of an operation panel provided by the VNC server 403 is transmitted by the POST method to the server connector 1801 of the device connector 401. Also, the client connector 1802 of the terminal device 120 uses the POST method when transmitting data to the server connector 1801. For example, key/mouse input information provided by the VNC viewer 1803 is transmitted by the POST method to the server connector 1801 from the client connector 1802. Also, when the device connector 401 receives data from the server connector 1801, and when the client connector 1802 receives data from the server connector 1801, the GET method is used. For example, key/mouse information transmitted to the server connector 1801 from the client connector 1802 is received from the server connector 1801 by the device connector 401 using the GET method. Also, screen information transmitted from the device connector 401 to the server connector 1801 is received from the server connector 1801 by the client connector 1802 using the GET method. Furthermore, it is assumed that separate connections are used for transmission and for reception. Also, by using a chunk communication defined in RFC 2616, data transmission and receiving are performed without limiting a size in a one time method. However, the present invention is not limited to these embodiments, and the method used for data transmission and receiving may be either of GET/POST, or another method defined in an HTTP. Also, the same connection may be shared for data transmission and receiving. Also, in cases where, for example, a real-time nature is not a necessity, a configuration may be taken such that data transmission and receiving are not continuously performed with a one time method, and rather an HTTP request/response is performed periodically.

Figure 19:
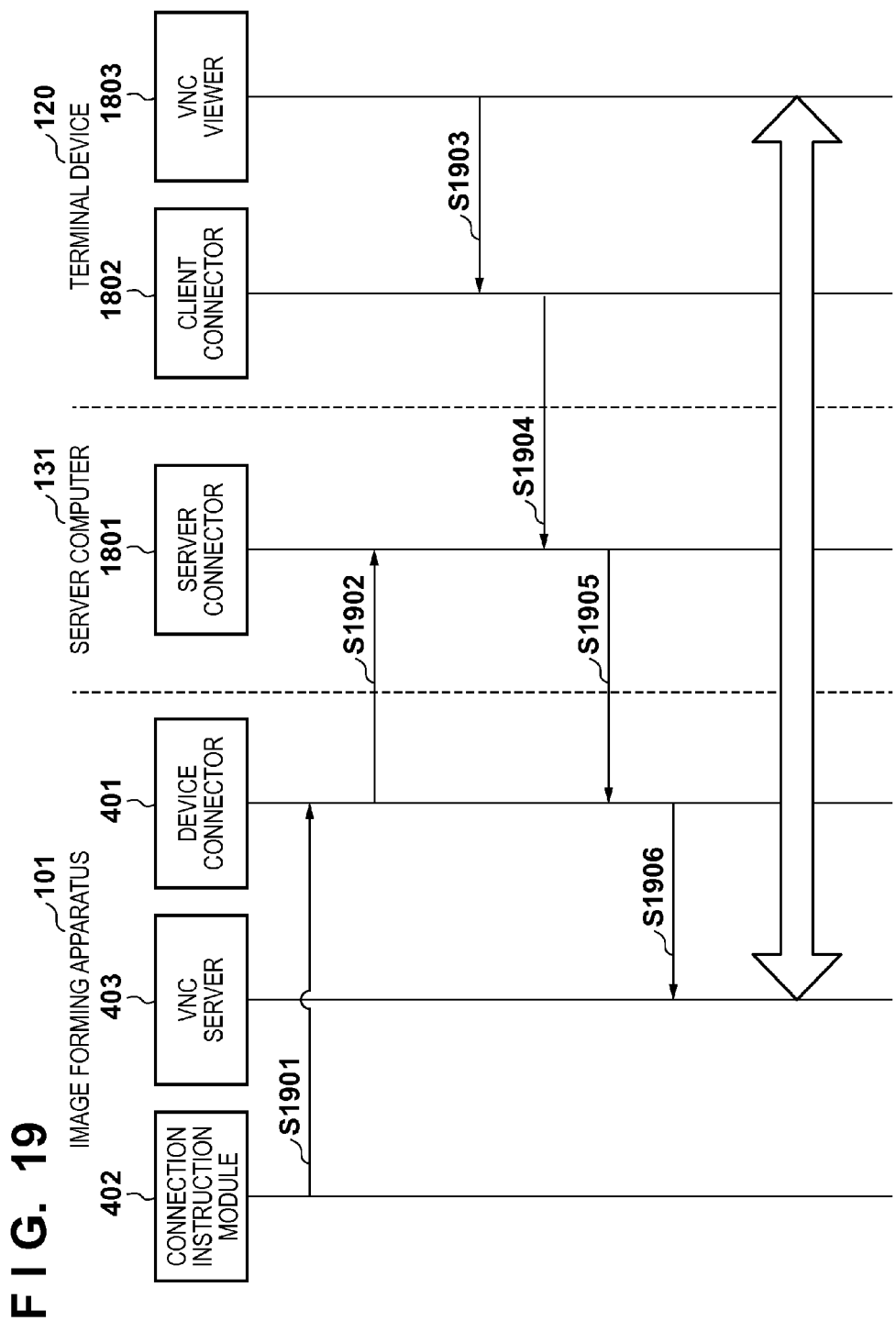
FIG. 19 is a sequence diagram for explaining a flow of processing up until a connection is established between the VNC viewer and the VNC server according to the fourth embodiment.

FIG. 19 is a sequence diagram for explaining a flow of processing up until the VNC server 403 of the image forming apparatus 101 establishes a connection with the VNC viewer 1803 of the terminal device 120 according to the fourth embodiment.

In step S1901, the connection instruction module 402 transmits a connection instruction to the device connector 401. Next, in step S1902, the device connector 401 connects to the server connector 1801, and transmits a POST method for data transmission and a GET method for data reception. With this, the image forming apparatus 101 and the server computer 131 are connected.

Next, in step S1903, the VNC viewer 1803 of the terminal device 120 connects to the client connector 1802. Next, in step S1904, the client connector 1802 of the terminal device 120 connects to the server connector 1801, and transmits a POST method for data transmission, and a GET method for data reception. Next, in step S1905, the server connector 1801 of the server computer 131 transmits a connection request to the VNC server 403 as a GET method response to the device connector 401. In step S1906, the device connector 401 of the image forming apparatus 101 connects to the VNC server 403 upon receiving the connection request.

By the above, a connection between the VNC viewer 1803 of the terminal device 120 and the VNC server 403 of the image forming apparatus 101 is established.

Note, the transmission of the connection request in step S1905 is performed as a response to the GET method that the device connector 401 transmits in step S1902. However, configuration may be taken such that the device connector 401 periodically transmits GET methods, and performs responses.

Figure 20:
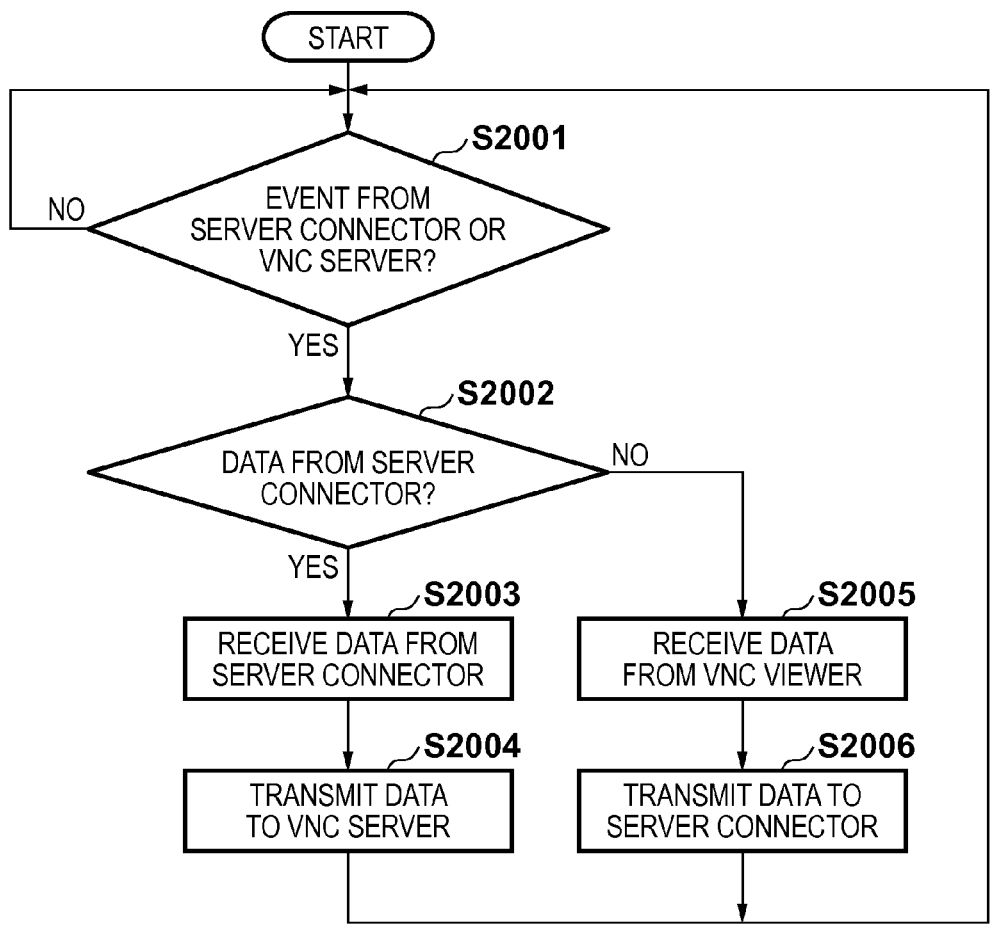
FIG. 20 is a flowchart for describing processing after a connection establishment between the device connector of the image forming apparatus and the server connector according to the fourth embodiment.

FIG. 20 is a flowchart for describing processing after a connection establishment with the server connector 1801 by the device connector 401 of the image forming apparatus 101 according to the fourth embodiment. Note, a program for executing this processing is stored in the external storage apparatus 211 of FIG. 2, deployed into the RAM 202, and executed by the CPU 201.

Firstly, in step S2001, the device connector 401 waits for a data reception event from the server connector 1801 of the server computer 131 or the VNC server 403. When an event occurs, the processing proceeds to step S2002, and the device connector 401 determines whether or not the event is a data reception event from the server connector 1801, and if it is, the processing proceeds to step S2003. In step S2003, the device connector 401 receives data from the server connector 1801 of the server computer 131 as a GET method response. Next, the processing proceeds to step S2004, and the device connector 401 transmits the data received in step S2003 to the VNC server 403 and the processing returns to step S2001. With this, the image forming apparatus 101 is able to display on the operation panel 205 based on the key/mouse information received from the terminal device 102 via the server computer 131.

Meanwhile, in a case where it is determined that the event is not the data reception event from the server connector 1801 in step S2002, the processing proceeds to step S2005, and the device connector 401 receives data from the VNC server 403. Next, the processing proceeds to step S2006, and the device connector 401 transmits the data received in step S2005 as POST method request data to the server connector 1801 of the server computer 131 and the processing returns to step S2001. With this, the screen information of the operation panel 205 of the image forming apparatus 101 can be transmitted to the server computer 131.

Figure 21:
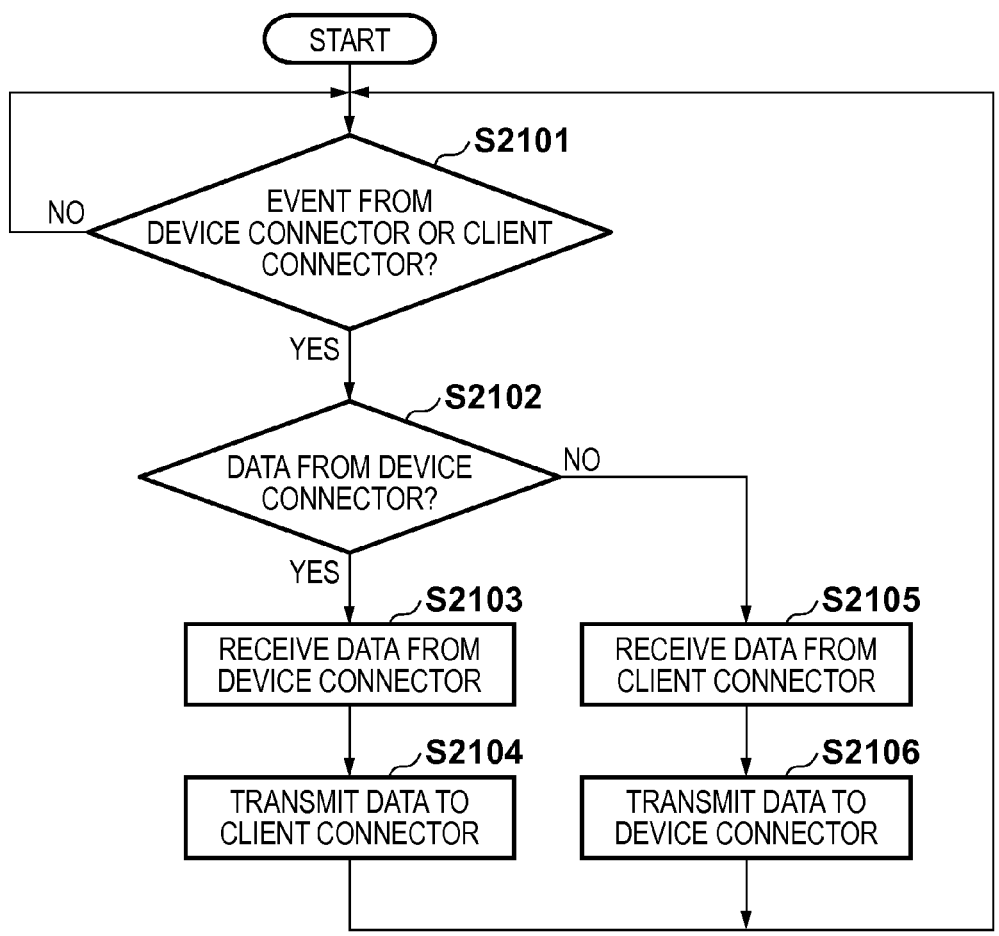
FIG. 21 is a flowchart for describing processing after the server connector of the server computer establishes a connection between the device connector and a client connector according to the fourth embodiment.

FIG. 21 is a flowchart for describing processing after the server connector 1801 of the server computer 131 establishes a connection between the device connector 401 and the client connector 1802 according to the fourth embodiment. Note, this processing is realized by a program for executing this processing being stored in the HDD 312 of the server computer 131, being deployed into the RAM 303 upon execution, and the CPU 301 executing the program.

Firstly, in step S2101, the server connector 1801 waits for a data reception event from the device connector 401 or the client connector 1802. When an event occurs, the processing proceeds to step S2102, and the device connector 401 determines whether or not the event is a data reception event from the server connector 1801, and if it is, the processing proceeds to step S2103. In step S2103, the server connector 1801 receives data from the device connector 401 as POST method request data. Next, the processing proceeds to step S2104, and the server connector 1801 transmits to the client connector 1802 of the terminal device 120 the data received in step S2103 as a GET method response, and the processing returns to step S2101. With this, the server computer 131 is able to mediate communication so that information from the image forming apparatus 101 is transmitted to the terminal device 120.

Meanwhile, in a case where it is determined that the event is not the data reception event from the device connector 401 in step S2102, the processing proceeds to step S2105, and the server connector 1801 receives data from the client connector 1802 of the terminal device 120 as POST method request data. Next, the processing proceeds to step S2106, and the server connector 1801 transmits the data received in step S2105 as a GET method response to the device connector 401, and the processing returns to step S2101. With this, the server computer 131 is able to mediate communication so that information from the terminal device 120 is transmitted to the image forming apparatus 101.

Figure 22:
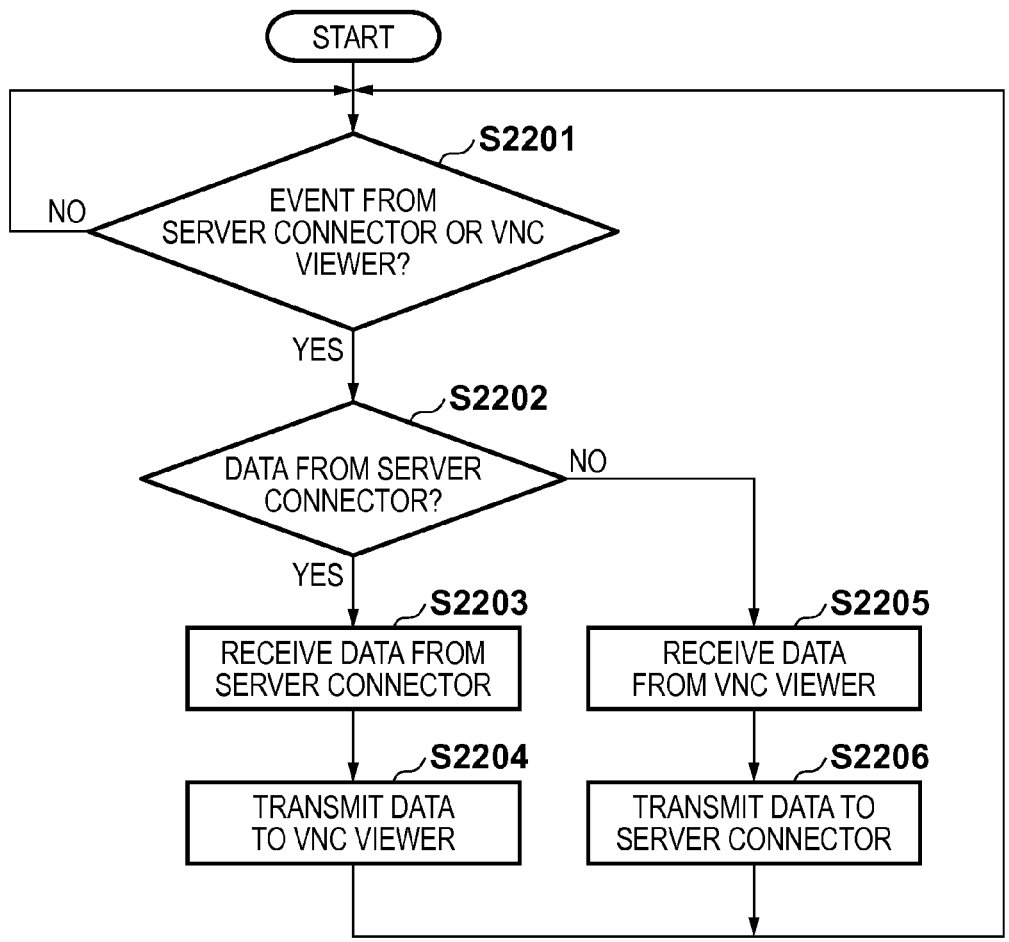
FIG. 22 is a flowchart for describing processing after the client connector of the terminal device establishes a connection with the server connector of the server computer according to the fourth embodiment.

FIG. 22 is a flowchart for describing processing after the server connector 1801 of the server computer 131 establishes a connection between the terminal device 120 and the client connector 1802 according to the fourth embodiment. Note, this processing is realized by a program for executing this processing being stored in the HDD 312 of the terminal device 120, being deployed into the RAM 303 upon execution, and the CPU 301 executing the program.

Firstly, in step S2201, the client connector 1802 waits for a data reception event from the server connector 1801 of the server computer 131 or the VNC viewer 1803 of the terminal device 120. When an event occurs, the processing proceeds to step S2202, and the client connector 1802 determines whether or not the event is a data reception event from the server connector 1801, and if it is, the processing proceeds to step S2203. In step S2203, the client connector 1802 receives data from the server connector 1801 of the server computer 131 as a GET method response. Next, the processing proceeds to step S2204, and the client connector 1802 transmits the data received in step S2203 to the VNC viewer 1803 and the processing returns to step S2201. With this, regarding the terminal device 120, the VNC viewer 1803 is able to display screen information was received from the image forming apparatus 101 via the server computer 131 on the screen of the terminal device 120.

Meanwhile, in a case where it is determined that the event is not a data reception event from the server connector 1801 in step S1802, the processing proceeds to step S2205, and the client connector 1802 receives data from the VNC viewer 1803. Next, the processing proceeds to step S2206, and the client connector 1802 is transmitted the data received in step S2205 to the server connector 1801 as POST method request data, and the processing returns to step S2201. With this, key input information input on the operation screen of the terminal device 120 can be displayed on the operation panel 205 by transmitting the key input information to the image forming apparatus 101 via the server computer 131.

As explained above, by virtue of the fourth embodiment, exchange of key operation information on the operation screen is possible between the image forming apparatus and the terminal device without providing a protocol converter such as in the previously described embodiments.

Other Embodiment

As an additional embodiment, when the server connector 501 of the server computer 131 is connected to from the device connector 401, and device information of the image forming apparatus 101 is received, a serviceman responsible for the image forming apparatus 101 is identified. Then, configuration may be taken such that an electronic mail is transmitted to the identified serviceman. With this, it will become possible for the serviceman to immediately notice and access the Web server, and perform support quickly.

Also, in a case where the serviceman did nothing in a predetermined time period after the server connector 501 of the server computer 131 is connected to from the device connector 401, configuration may be taken such that the server connector 501 transmits a message to the device connector 401. With this, configuration may be taken such that the device connector 401 of the image forming apparatus 101, in accordance with the content of the received message, displays a message to the user on the operation panel 205 such as, for example, "please wait momentarily" or "please call for service".

Also, in the above described embodiments, explanation was given for a case where the server function that the image forming apparatus 101 provides is a VNC server, but it may be a different server function from the VNC server such as a file server, a Web server, or the like. Note, in a case where the server function that the image forming apparatus 101 provides is a Web server, the protocol converter 502 of the server computer 131 only mediates communication between the Web server 503 and the server connector 501.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)BD)he present invention can also be realized by a computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-162799, filed Aug. 5, 2013, which is hereby incorporated by reference herein in its entirety.

What is claimed is:

1. A method of controlling in a communication system including an image processing apparatus having a VNC (Virtual Network Computing) server and a Web client, a terminal device having a VNC viewer and a Web client, and an information processing apparatus having a Web server, the method comprising:

a first connection step of, by the Web client of the image processing apparatus, making a request for a connection to the Web server of the information processing apparatus to establish a first connection;
a second connection step of, by the Web client of the terminal device, making a request for a connection to the Web server of the information processing apparatus to establish a second connection;
a first transmission step of, by the Web client of the image processing apparatus, transmitting to the Web server of the information processing apparatus, screen information of an operation panel of the image processing apparatus provided by the VNC server of the image processing apparatus;
a first request step of, by the Web client of the terminal device, making a request for data to the Web server of the information processing apparatus;
a first response step of, by the Web server of the information processing apparatus, transmitting to the Web client of the terminal device, the screen information transmitted in the first transmission step as a response in response to the request in the first request step; and
a first display control step of, by the VNC viewer of the terminal device, controlling to display based on the screen information transmitted in the first response step.

2. The method of controlling according to claim 1, further comprising:
a second transmission step of, by the Web client of the terminal device, transmitting to the Web server of the information processing apparatus, key input information provided by the VNC viewer of the terminal device;
a second request step of, by the Web client of the image processing apparatus, making a request for data to the Web server of the information processing apparatus;
a second response step of, by the Web server of the information processing apparatus, transmitting to the Web client of the image processing apparatus, the key input information transmitted in the second transmission step as a response in response to the request in the second request step; and
a second display control step of, by the image processing apparatus, controlling to display the operation panel based on the key input information transmitted in the second response step.

3. The method of controlling according to claim 1, wherein in the first transmission step, the screen information is transmitted by a POST method defined in an HTTP, and
in the first request step, the request for the data is made by a GET method defined in the HTTP, and
in the first response step, the screen information is transmitted as a response in response to the GET method.

4. The method of controlling according to claim 2, wherein in the second transmission step, the key input information is transmitted by a POST method defined in an HTTP, and
in the second request step, the request for the data is made by a GET method defined in the HTTP, and
in the second response step, the key input information is transmitted as a response in response to the GET method.

* * * * *